US007635041B2

(12) United States Patent
Adachi

(10) Patent No.: US 7,635,041 B2
(45) Date of Patent: Dec. 22, 2009

(54) INVERTED TWO-WHEELED ROBOT

(75) Inventor: Yuji Adachi, Osaka (JP)

(73) Assignee: Panasonic Corporation, Osaka (JP)

( * ) Notice: Subject to any disclaimer, the term of this patent is extended or adjusted under 35 U.S.C. 154(b) by 109 days.

(21) Appl. No.: 11/790,749

(22) Filed: Apr. 27, 2007

(65) Prior Publication Data

US 2008/0173493 A1 Jul. 24, 2008

Related U.S. Application Data

(63) Continuation of application No. PCT/JP2006/313579, filed on Jul. 7, 2006.

(30) Foreign Application Priority Data

Jul. 26, 2005 (JP) ............................. 2005-215789

(51) Int. Cl.
*B62D 61/00* (2006.01)
(52) U.S. Cl. ..................................................... 180/218
(58) Field of Classification Search ................ 180/218
See application file for complete search history.

(56) References Cited

U.S. PATENT DOCUMENTS

| 5,971,091 | A | | 10/1999 | Kamen et al. | |
|---|---|---|---|---|---|
| 6,062,600 | A | * | 5/2000 | Kamen et al. | 280/755 |
| 6,367,817 | B1 | * | 4/2002 | Kamen et al. | 280/5.507 |
| 6,561,294 | B1 | * | 5/2003 | Kamen et al. | 180/21 |
| 6,571,892 | B2 | | 6/2003 | Kamen et al. | |
| 6,799,649 | B2 | * | 10/2004 | Kamen et al. | 180/8.2 |
| 7,004,271 | B1 | * | 2/2006 | Kamen et al. | 180/21 |
| 7,178,614 | B2 | * | 2/2007 | Ishii | 180/7.1 |
| 7,210,544 | B2 | * | 5/2007 | Kamen et al. | 180/7.1 |
| 7,363,993 | B2 | * | 4/2008 | Ishii | 180/7.1 |
| 7,481,291 | B2 | * | 1/2009 | Nishikawa | 180/218 |
| 2004/0055796 | A1 | * | 3/2004 | Kamen et al. | 180/21 |
| 2004/0178008 | A1 | * | 9/2004 | Kawarasaki | 180/65.1 |
| 2005/0252700 | A1 | * | 11/2005 | Kitauchi et al. | 180/65.1 |
| 2006/0231313 | A1 | * | 10/2006 | Ishii | 180/218 |

FOREIGN PATENT DOCUMENTS

| JP | 2530652 | 9/1996 |
|---|---|---|
| JP | 2003-330537 | 11/2003 |
| JP | 2004-74814 | 3/2004 |
| JP | 2004-295430 | 10/2004 |
| JP | 2005-145293 | 6/2005 |

* cited by examiner

*Primary Examiner*—Lesley D Morris
*Assistant Examiner*—Daniel Yeagley
(74) *Attorney, Agent, or Firm*—Wenderoth, Lind & Ponack L.L.P.

(57) ABSTRACT

A two-wheeled inverted robot includes a body, two wheels coaxially arranged on the body, a drive device for driving each of the wheels, a first state detector for detecting at least one of an inclination angle and an inclination angular speed of the body, a second state detector for detecting at least one of a rotation angle and a rotational angular speed of the wheel, a body constraint recognizing device for detecting whether or not body rotation is constrained, and a controller for determining a command value to the drive device. Based on the detection result by the body constraint recognizing device, the controller determines the command value for changing a ratio of a torque contributing to the body rotation.

7 Claims, 11 Drawing Sheets

INVERTED TWO-WHEELED ROBOT

This is a continuation application of International Application No. PCT/JP2006/313579, filed Jul. 7, 2006.

BACKGROUND OF THE INVENTION

The present invention relates to a two-wheeled inverted robot in which coaxial two wheels are used among robots which perform load carriage work, and particularly relates to the two-wheeled inverted robot in constraining the robot attitude.

In the robot which performs the load carriage work, generally the robot maintains its stability by necessarily bringing at least three points into contact like a three-wheel type robot or a four-wheel type robot. However, the three-wheel type robot or the four-wheel type robot occupies a large area and hardly has a small turning circle. Therefore, there has been developed a coaxial two-wheel type robot which operates based on an inverted pendulum model.

For example, there is known a coaxial two-wheel type moving robot described in Japanese Patent No. 2530652 and Japanese Unexamined Patent Publication No. 2004-74814.

FIG. 13 shows a conventional coaxial two-wheel type moving robot described in Japanese Patent No. 2530652.

The coaxial two-wheel type moving robot described in Japanese Patent No. 2530652 includes a body 104, a wheel drive motor 105, a control computer 106, and an angle detection means 107. The body 104 is rotatably supported on an axle shaft 101 which includes a pair of wheels 102 and 103 at both ends. The wheel drive motor 105 is attached to the body 104. The control computer 106 issues an operation command to the wheel drive motor 105. The angle detection means 107 detects inclination of the body 104. An inclination angle of the body 104 detected by the angle detection means 107 is sampled at short time intervals, the inclination angle of the body 104 is set at a state variable input value, and a feedback gain K is set at a coefficient. Then, a control torque of the wheel drive motor 105 is computed to perform state feedback control based on a control input computation equation which is previously inputted and set in the control computer 106. The control computer 106 issues an actuation command corresponding to the computed control torque to the wheel drive motor 105, which maintains the inverted attitude control.

FIG. 14 shows a conventional human-transport coaxial two-wheel type moving robot described in Japanese Publication No. 2004-74814.

In the human-transport coaxial two-wheel type moving robot described in Japanese Publication No. 2004-74814, the attitude control and running control are performed to maintain a fore-and-aft balance by controlling and driving right and left driving wheels 202 coaxially arranged on a platform 201 according to output of an attitude sensor. The human-transport coaxial two-wheel type moving robot includes an auxiliary wheel 203 which comes into contact with the ground on the front side and/or rear side of the driving wheels 202 and an auxiliary wheel drive unit 204 which extends and retracts the auxiliary wheel 203. The human-transport coaxial two-wheel type moving robot includes a control circuit which drives the auxiliary wheel drive unit 204 to extend and retract the auxiliary wheel 203 according to an obstacle detection sensor 205 and control states of running speed and attitude. Therefore, when an obstacle which tends to cause falling exists, because the auxiliary wheel 203 is extended to enhance safety, the risk of the falling can be decreased.

In the technique described in Japanese Patent No. 2530652, the state feedback control is always performed.

When the coaxial two-wheeled body 104 and the wheels 102 and 103 can relatively be rotated with no constraint, the torque generated by the wheel drive motor 105 contributes to the rotations of the wheels 102 and 103, and simultaneously a reaction torque acts on the body 104 to be able to maintain the inverted attitude control as a whole.

However, when a part of the body 104 comes into contact with a wall or the ground to receive a constraint force from the outside to such an extent that the body 104 cannot rotate any more, not only does the body 104 not rotate, but also the torque generated by the constraint force is transmitted to the wheels 102 and 103. Therefore, when compared with no constraint force, the excessive torque is applied to the wheels 102 and 103, which results in an issue that the wheel rotation is increased to rapidly enhance the running speed.

In the technique described in Japanese Publication No. 2004-74814, when the obstacle is detected by the obstacle detection sensor 205, because the human-transport coaxial two-wheel type moving robot has the mechanism in which the auxiliary wheel drive unit 204 is driven to extend and retract the auxiliary wheel 203, the extension of the auxiliary wheel 203 enables the three-point ground contact of the right and left driving wheels 202 and the auxiliary wheel 203 to decrease the risk of falling.

However, in the technique described in Japanese Publication No. 2004-74814, only the obstacle is recognized to extend the auxiliary wheel 203, and the speed and the attitude depend on the control of a user. Therefore, in the configuration described in Japanese Publication No. 2004-74814, as with Japanese Patent No. 2530652, there is also the issue that excessive torque is applied to the driving wheel 202 to rapidly enhance the running speed, when a user breaks down the balance to bring the body portion including the platform 201 into contact with the ground, or when the body portion including the platform 201 is brought into contact with the wall or the like to receive the constraint force to such an extent that the body portion cannot rotate. In this case, a stop command is transmitted to avoid the risk by the control of the user. However, there is the issue that a burden is placed on the user to the point that the operation depends on the user.

An object of the present invention is to provide a safe two-wheeled inverted robot and a control method thereof, in which the above issues are solved and the attitude control and the running state can be maintained and the burden is not placed on the user, when a part of the body of the coaxial two-wheeled robot which is moved while the inverted control is performed comes into contact with the ground or the wall to receive the constraint force.

SUMMARY OF THE INVENTION

The present invention is configured as follows in order to achieve the above object.

According to a first aspect of the present invention, there is provided a two-wheeled inverted robot comprising:

a body;

two wheels which are coaxially arranged on the body;

a drive device for driving the wheels respectively;

a first state detection means for detecting at least one of an inclination angle and an inclination angular speed of the body;

a second state detection means for detecting at least one of a rotation angle and a rotational angular speed of the wheel;

a body constraint recognizing means for receiving information detected by the first state detection means or the second state detection means, to detect whether or not rotation of the body in an inclination direction is constrained; and a control means for determining a command value to the drive device, changing a plurality of running control methods by the determined command value to drive the drive device, and thereby performing running control of the body, wherein the control means determines, based on detection result of the body constraint recognizing means, the command value to the drive device for changing the plurality of running control methods, the drive device is driven by the determined command value, and the running control of the body is performed to maintain a running state.

According to a tenth aspect of the present invention, there is provided a method of controlling a two-wheeled inverted robot, comprising:

detecting at least one of an inclination angle and an inclination angular speed of a body as first state detection information;

detecting at least one of a rotation angle and a rotational angular speed of a wheel as second state detection information;

inputting the first state detection information or the second state detection information to detect whether or not rotation of the body in an inclination direction is constrained as body constraint recognizing information; and changing a plurality of running control methods with control means based on the detected body constraint recognizing information, determining a command value to a drive device which drives each of the two wheels coaxially arranged in the body, changing the plurality of running control methods to drive the drive device by the determined command value, and performing the running control of the body to maintain a running state.

According to the configuration of the present invention, when a part of the body of the two-wheeled inverted robot which runs while the inverted control is performed comes into contact with the ground or the wall to constrain the rotation, the constraint in the rotational direction of the body is recognized by the body constraint recognizing means or the body constraint recognizing operation. For example, a change in ratio of the torque contributing to the body rotation according to the recognized constraint state can solve the issue that the attitude control cannot be maintained but the running speed is rapidly increased due to the application of the excessive torque to the wheel.

Consequently, according to the configuration of the present invention, in the inverted coaxial two-wheeled robot which is moved while the inverted control is performed, the attitude control and the running state can be maintained and the robot can be moved while the burden is not placed on the user, even if a part of the body comes into contact with the ground or the wall to constrain the rotation.

BRIEF DESCRIPTION OF THE DRAWINGS

These and other aspects and features of the present invention will become clear from the following description taken in conjunction with the preferred embodiments thereof with reference to the accompanying drawings, in which.

DETAILED DESCRIPTION OF THE PREFERRED EMBODIMENTS

Figure 1A:
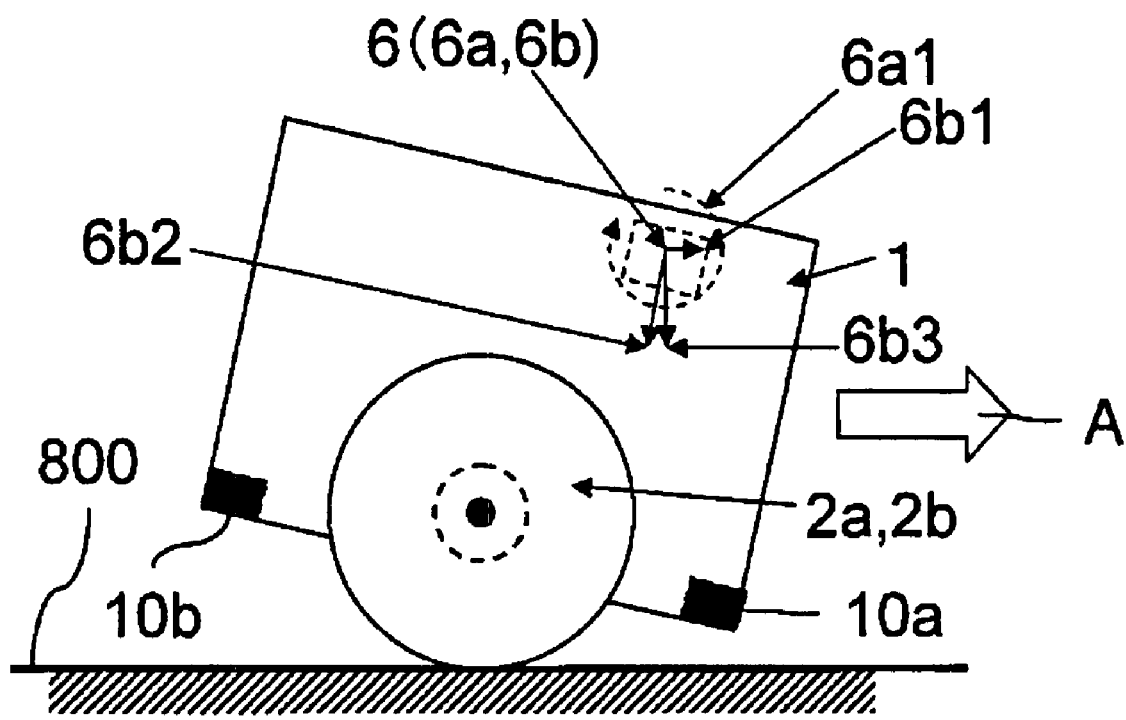
FIG. 1A is a side view showing a state in which a two-wheeled inverted robot according to a first embodiment of the present invention is inclined.

Before the description of the present invention proceeds, it is to be noted that like parts are designated by like reference numerals throughout the accompanying drawings.

Preferred embodiments of the present invention will be described in detail below with reference to the drawings.

First Embodiment

A two-wheeled inverted robot according to a first embodiment of the present invention and a control method thereof will be described below with reference to the drawings.

Figure 2:
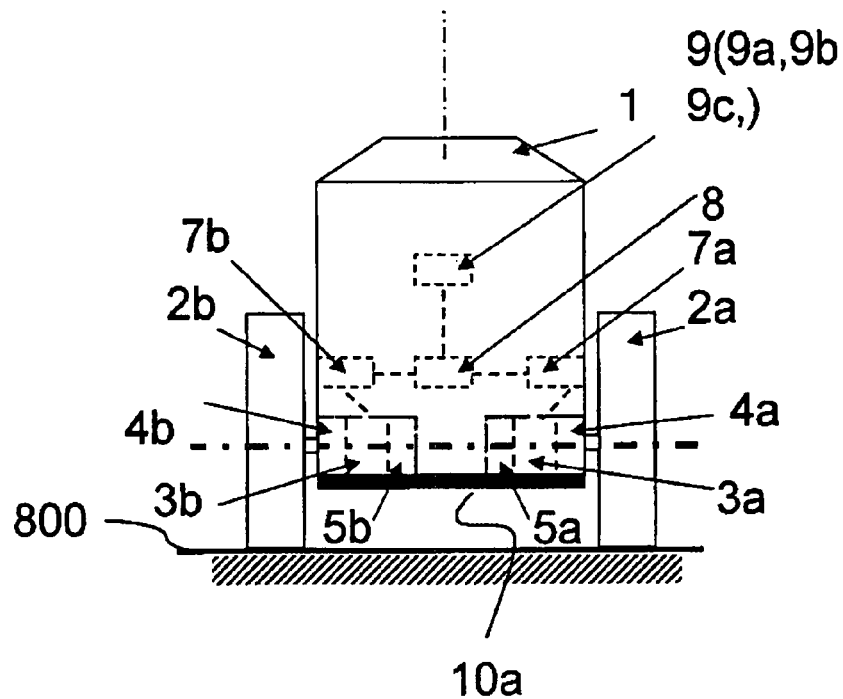
FIG. 2 is a front view showing the state in which the two-wheeled inverted robot according to the first embodiment of the present invention is inclined.

FIG. 1A is a side view showing a state in which the two-wheeled inverted robot of the first embodiment of the present invention is inclined, and FIG. 2 is a front view showing the state in which the two-wheeled inverted robot is inclined. Two wheels 2a and 2b are substantially coaxially arranged for a body 1 of the robot. In this case, the two wheels 2a and 2b are respectively set as the left wheel 2a and the right wheel 2b with respect to the forward direction shown by an arrow A in the body 1 of FIG. 1A. FIG. 2 is a front view showing the two-wheeled inverted robot when viewed from the forward direction of the body 1. Actuators 3a and 3b function as an example of the drive device, and the actuators 3a and 3b independently generate drive forces between the wheels 2a and 2b and the body 1 respectively. The actuators 3a and 3b are attached near the wheels 2a and 2b of the body 1, and the actuators 3a and 3b are coupled to the wheels 2a and 2b respectively. For the sake of explanation, it is assumed that the actuators 3a and 3b are motors. Speed reducers 4a and 4b may be attached to the motors 3a and 3b so that these devices 4a, 4b, 3a, 3b may constitute an example of the drive device. Encoders 5a and 5b, which can measure rotation angles of the body 1 and wheels 2a and 2b, are also attached to the motors 3a and 3b. The encoders 5a and 5b function as an example of the second state detection means for detecting at least one of the rotation angle and a rotational angular speed in each of the wheels 2a and 2b as the second state detection information. The rotation angle is measured at a constant sampling time (for example, every 1 ms), and the difference is divided by the sampling time to determine the rotational angular speed, so that the rotational angular speed can be dealt with as the second state detection information.

Two sensors of a uniaxial gyroscope 6a and a biaxial acceleration sensor 6b are attached to an upper portion of the body 1. The two sensors are an example of an attitude sensor 6 for detecting the attitude in a vertical plane in which an axle shaft direction of the body 1 is set at normal, namely, the two sensors function as an example of the first state detection means for detecting at least one of an inclination angle and an inclination angular speed of the body as the first state detection information. The uniaxial gyroscope 6a is attached to the body 1 in the vertical plane in which the axle shaft direction is set at the normal such that the inclination angular speed in the axle shaft direction can be detected as the first state detection information, and the uniaxial gyroscope 6a can also detect the inclination angular speed (shown by arc 6a1) in the vertical plane in which the axle shaft direction of the body 1 is set at the normal. The biaxial acceleration sensor 6b is attached so as to be able to detect acceleration with respect to two given directions (6b1 and 6b2) in the vertical plane in which the axle shaft direction is set at the normal, and the biaxial acceleration sensor 6b can detect a gravitational direction (6b3). The attitude angle (inclination angle) of the body 1 which is of the first state detection information is determined as follows. An integration value of the uniaxial gyroscope 6a and a value from the biaxial acceleration sensor 6b are processed by a highpass filter and a lowpass filter in a control computer unit 9 respectively, and the processed values are combined by the control computer unit 9 to determine the information.

Contact sensors 10a and 10b are provided in lower portions of the front and rear of the body 1. The contact sensors 10a and 10b can measure contact force from another object to the lower portions of the front and rear of the body 1 as the contact information.

Figure 1B:
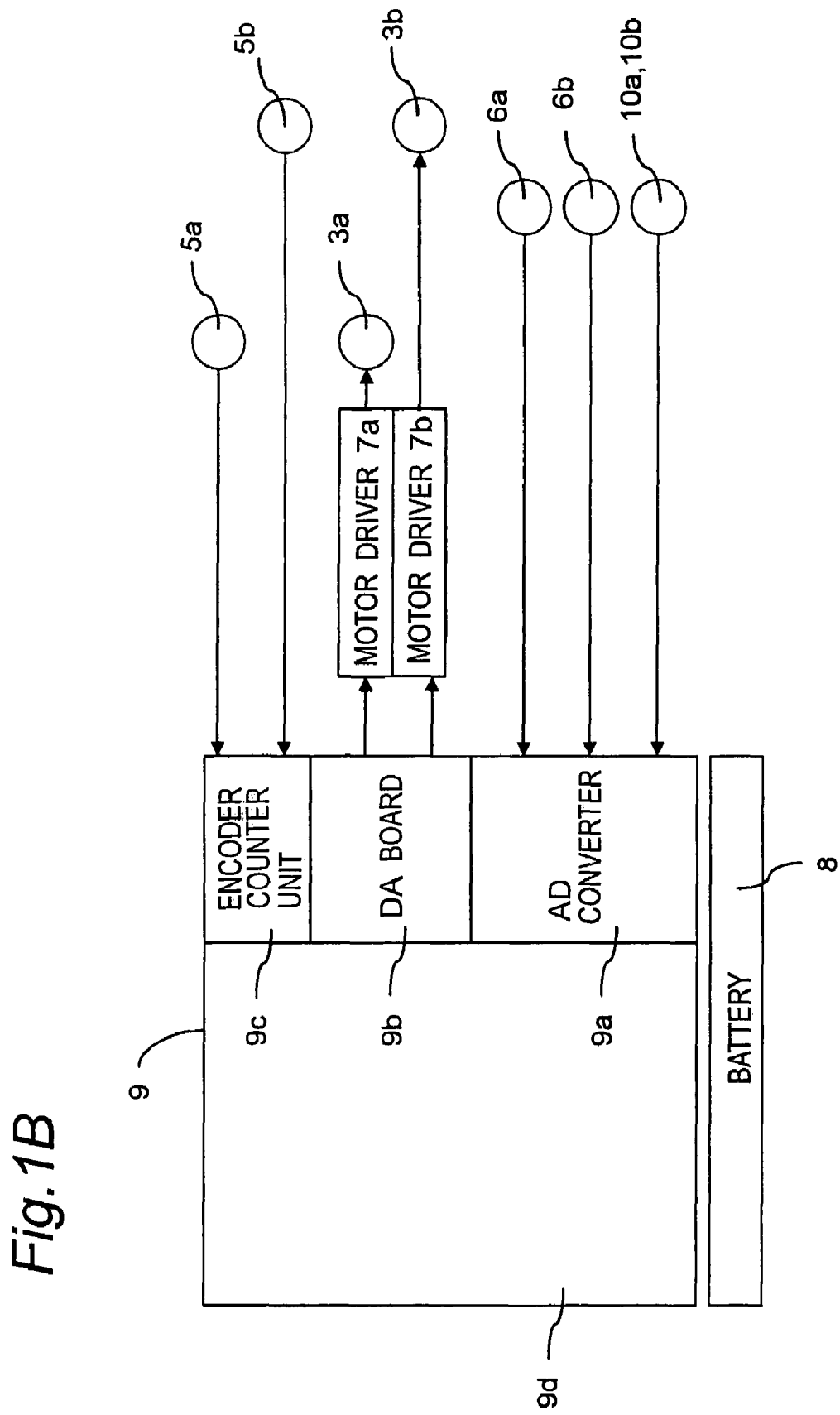
FIG. 1B is a block diagram showing a control unit and the like of the two-wheeled inverted robot according to the first embodiment of the present invention.

Motor drivers 7a and 7b and a battery 8 and the control computer unit 9 are mounted in the body 1. The motor drivers 7a and 7b and the battery 8 drive the motors 3a and 3b, and the control computer unit 9 functions as an example of the control means and the body constraint recognizing means. As shown in FIG. 1B, the control computer unit 9 includes an A/D converter 9a, a D/A converter 9b, an encoder counter unit 9c, and an arithmetic unit 9d. The values of the encoders 5a and 5b are input into the arithmetic unit 9d through the encoder counter unit 9c. The values of the uniaxial gyroscope 6a, the biaxial acceleration sensor 6b, and the contact sensors 10a and 10b are input into the arithmetic unit 9d through the A/D converter 9a. Based on the inputted values from the contact sensors 10a and 10b, the arithmetic unit 9d detects whether or not the rotation in the inclination direction of the body 1 is constrained, and the arithmetic unit 9d can produce the body constraint recognizing information. Examples of the produced body constraint recognizing information include information on the constraint force to the body 1 which is judged by the inputs of the contact sensors 10a and 10b (see the first embodiment), information on the presence or absence of the contact which is judged by the inputs of the contact sensors 10a and 10b (see the second embodiment), information on the inclination angle of the body 1 (see the third embodiment), and the like. As described later, the body constraint recognizing information can be used in changing the control method. The arithmetic unit 9d of the control computer unit 9 computes the torques necessary for the attitude control and running control from the values inputted to the arithmetic unit 9d, and the D/A converter 9b issues torque command values to the motor drivers 7a and 7b. The motor drivers 7a and 7b drive the motors 3a and 3b based on the command values, respectively. The method of computing the output value from the input value will be described later.

Figure 3:
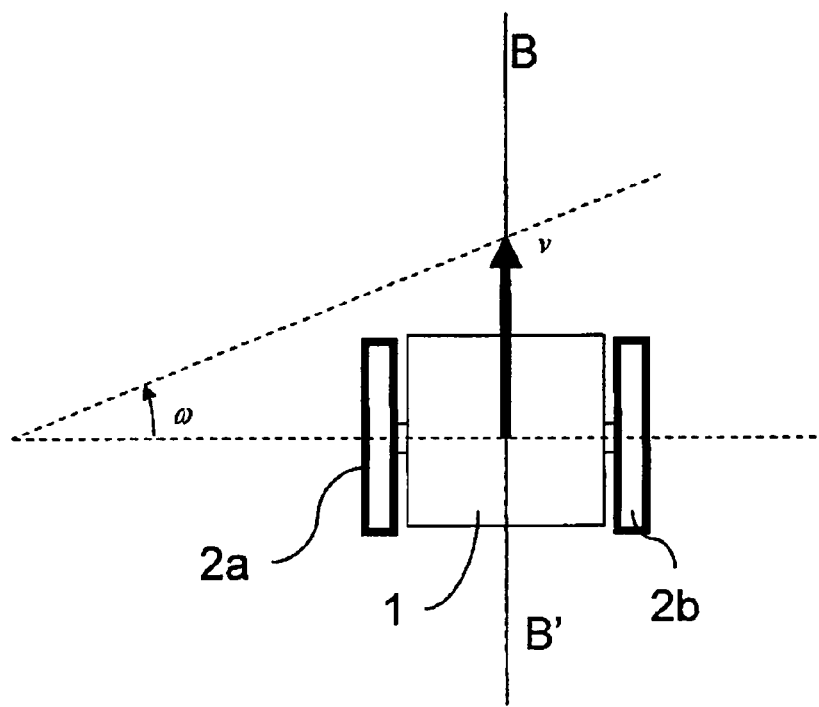
FIG. 3 is an explanatory view showing a movement configuration of the two-wheeled inverted robot according to the first embodiment of the present invention.

Then, a method of controlling the two-wheeled inverted robot having the above configuration will be described with reference to FIG. 3. FIG. 3 shows the robot when viewed from above in a vertical direction. It can be thought that the mechanism is divided into two kinds of control of translational control 11 (attitude control+fore-and-aft movement control) and turning control 12. The translational control 11 relates to the attitude in the vertical plane (B-B' plane) in which the axle shaft direction is set at the normal and the horizontal speed in the vertical plane. The turning control 12 relates to the operation in the turning direction. The former performs the attitude control and running control to maintain the running state so as to follow up a speed v in the translational direction. The latter performs the control so as to follow up an angular speed ω in the turning direction. As will be described later, the movement control (running control) can be performed to maintain the running state by combining these two kinds of control.

Then, the movement control will sequentially be described.

Figure 4:
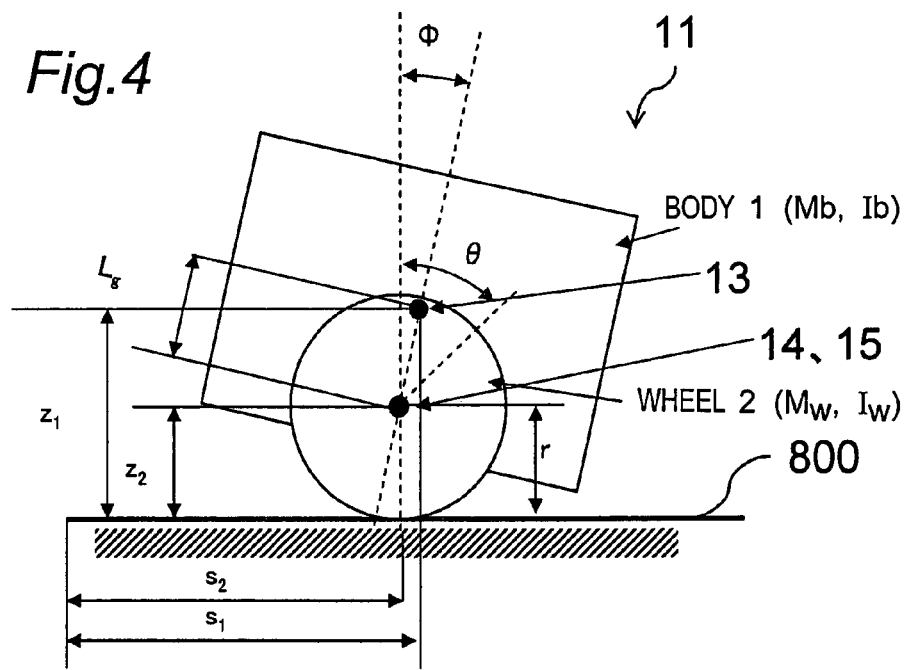
FIG. 4 is a view showing mechanical parameters of the two-wheeled inverted robot according to the first embodiment of the present invention.

First, the translational control 11 will be described with reference to FIG. 4 which shows mechanism parameters. Because the operation is performed in the vertical plane in which the axle shaft direction is set at the normal, the translational control 11 will be dealt with as a two-dimensional model. As shown in FIG. 4, the parameters are set as follows. The wheels 2a and 2b, the motors 3a and 3b, the speed reducers 4a and 4b, and the encoders 5a and 5b are regarded as one component respectively, and those are set at a wheel 2, a motor 3, a speed reducer 4, and an encoder 5 respectively. A gravity center of the body 1 is set at a body gravity center 13, the axle shaft of the wheel 2 is set at an axle shaft 14, and a gravity center of the wheel 2 is set at a wheel gravity center 15.

$M_b$: mass [kg] of the body 1 of the robot $M_w$: mass (total of two wheels) [kg] of the wheel 2

$I_b$: inertia moment [kgm$^2$] about the body gravity center 13 of the body 1 of the robot $I_w$: inertia moment (total of two wheels) [kgm$^2$] about the wheel gravity center 15 of the wheel 2

$I_m$: inertia moment [kgm$^2$] of the motor 3 r: radius [m] of the wheel 2

$L_g$: distance [m] from the axle shaft 14 to the body gravity center 13 of the robot $\mu_s$: viscous friction coefficient [Nm/(rad/s)] among the motor 3, the speed reducer 4, and the axle shaft 2

$\mu_g$: viscous friction coefficient [Nm/(rad/s)] between the wheel 2 and the ground 800

$\tau_t$: torque constant [Nm/A] of the motor 3

η: reduction gear ratio of a gear portion in the speed reducer 4 g: gravitational acceleration

φ: inclination [rad] of the body 1 of the robot

θ: rotation angle [rad] of the wheel 2 to the ground 800 u: current [A] inputted to the motor 3

Signs are as follows.

T: kinetic energy, U: potential energy, D: friction loss, $z_1$: body gravity center height, $z_2$: wheel gravity center height, $s_1$: body gravity center translational position, $s_2$: axle shaft translational position.

An equation of motion of the two-wheeled inverted robot is derived using a Lagrangian method. In the Lagrangian equation of motion expressed by the following Equations 1 and 2, each value and its differential value are expressed by the following Equations 3-10.

$$\frac{d}{dt}\left(\frac{\partial T}{\partial \dot{\phi}}\right) - \frac{\partial T}{\partial \phi} + \frac{\partial U}{\partial \phi} + \frac{\partial D}{\partial \phi} = Q_1 \qquad \text{(Equation 1)}$$

$$\frac{d}{dt}\left(\frac{\partial T}{\partial \dot{\theta}}\right) - \frac{\partial T}{\partial \theta} + \frac{\partial U}{\partial \theta} + \frac{\partial D}{\partial \theta} = Q_2 \qquad \text{(Equation 2)}$$

$$s_1 = r\theta + L_g \sin\phi \qquad \text{(Equation 3)}$$

$$s_2 = r\theta \qquad \text{(Equation 4)}$$

$$\dot{s}_1 = r\dot{\theta} + L_g \dot{\phi}\cos\phi \qquad \text{(Equation 5)}$$

$$\dot{s}_2 = r\dot{\theta} \qquad \text{(Equation 6)}$$

$$z_1 = r + L_g \cos\phi \qquad \text{(Equation 7)}$$

$$z_2 = r \qquad \text{(Equation 8)}$$

$$\dot{z}_1 = -L_g \dot{\phi}\sin\phi \qquad \text{(Equation 9)}$$

$$\dot{z}_2 = 0 \qquad \text{(Equation 10)}$$

Each piece of energy is expressed by Equations 11-13.

$$T = \frac{1}{2}M_w(\dot{s}_2^2 + \dot{z}_2^2) + \frac{1}{2}M_b(\dot{s}_1^2 + \dot{z}_1^2) + \frac{1}{2}I_w\dot{\theta}^2 + \frac{1}{2}I_b\dot{\phi}^2 + \frac{1}{2}I_m\eta^2(\dot{\theta}-\dot{\phi})^2 \qquad \text{(Equation 11)}$$

$$U = M_w g r + M_b g (r + l\cos\phi) \qquad \text{(Equation 12)}$$

$$D = \frac{1}{2}\left(\mu_s(\dot{\theta}-\dot{\phi})^2 + u_g\dot{\theta}^2\right) \qquad \text{(Equation 13)}$$

In a simple model, when no external force is applied to the body 1, the Lagrangian equations of motion are expressed by Equations 14-15, $$Q_1 = -\eta\tau_1 u \qquad \text{(Equation 14)}$$

$$Q_2 = \eta\tau_1 u \qquad \text{(Equation 15)}$$

Therefore, kinetic energy T is obtained by the following Equation 16, $$T = \frac{1}{2}M_w(r^2\dot{\theta}^2) + \frac{1}{2}M_b(r^2\dot{\theta}^2 + 2r\dot{\theta}L_g\dot{\phi}\cos\phi + L_g^2\dot{\phi}^2) + \frac{1}{2}I_w\dot{\theta}^2 + \frac{1}{2}I_b\dot{\phi}^2 + \frac{1}{2}I_m\eta^2(\dot{\theta}-\dot{\phi})^2 \qquad \text{(Equation 16)}$$

The equation of motion is derived for the inclination $\phi$ of the body 1 of the robot by the Lagrangian method.

$$M_b(r\ddot{\theta}L_g\cos\phi + L_g^2\ddot{\phi}) + I_b\ddot{\phi} - I_m\eta^2(\ddot{\theta}-\ddot{\phi}) - M_b g l \sin\phi - (\mu_s(\dot{\theta}-\dot{\phi})) = (M_b L_g^2 + I_b + I_m\eta^2)\ddot{\phi} + (M_b r L_g \cos\phi - I_m\eta^2)\ddot{\theta} - M_b g l \sin\phi - \mu_s\dot{\theta} + \mu_s\dot{\phi} = -\eta\tau_1 u \qquad \text{(Equation 17)}$$

The equation of motion is derived for the rotation angle $\theta$ of the ground 800 of the wheel 2 by the Lagrangian method.

$$M_w(r^2\ddot{\theta}) + M_b(r^2\ddot{\theta} + rL_g\ddot{\phi}\cos\phi - rL_g\dot{\phi}^2\sin\phi) + I_w\ddot{\theta} + I_m\eta^2(\ddot{\theta}-\ddot{\phi}) + (\mu_s(\dot{\theta}-\dot{\phi}) + u_g\dot{\theta}) = (M_b r L_g \cos\phi - I_m\eta^2)\ddot{\phi} + ((M_b+M_w)r^2 + I_w + I_m\eta^2)\ddot{\theta} - M_b r L_g \dot{\phi}^2 \sin\phi + \mu_s\dot{\theta} - \mu_s\dot{\phi} + u_g\dot{\theta} = \eta\tau_1 u \qquad \text{(Equation 18)}$$

When (Equation 17) and (Equation 18) are added to each other, Equation 19 is obtained.

$$(M_b r L_g \cos\phi + M_b L_g^2 + I_b)\ddot{\phi} + ((M_b+M_w)r^2 + I_w + M_b r L_g \cos\phi)\ddot{\theta} - M_b g l \sin\phi - M_b r L_g \dot{\phi}^2 \sin\phi + u_g\dot{\theta} = 0 \qquad \text{(Equation 19)}$$

Therefore, (Equation 17) and (Equation 19) are approximated around $\phi=0$, $\dot{\phi}=0$ to obtain the following Equations.

$$(\sin\phi = \phi, \cos\phi = 1, \dot{\phi}^2 = 0)$$

$$(M_b L_g^2 + I_b + \eta^2 I_m)\ddot{\phi} + (M_b r L_g \cos\phi - \eta^2 I_m)\ddot{\theta} - M_b g l \phi - \mu_s\dot{\theta} + \mu_s\dot{\phi} = -\eta\tau_1 u \qquad \text{(Equation 20)}$$

$$(M_b r L_g + M_b L_g^2 + I_b)\ddot{\phi} + ((M_b+M_w)r^2 + M_b r L_g + I_w)\ddot{\theta} - M_b g l \phi + u_g\dot{\theta} = 0 \qquad \text{(Equation 21)}$$

When the variables are set as follows, $$\begin{pmatrix} a_{11} & a_{12} \\ a_{21} & a_{22} \end{pmatrix} = \begin{pmatrix} M_b L_g^2 + I_b + \eta^2 I_m & M_b r L_g \cos\phi - \eta^2 I_m \\ M_b r L_g + M_b L_g^2 + I_b & (M_b + M_w)r^2 + M_b r L_g + I_w \end{pmatrix} \qquad \text{(Equation 22)}$$

$$\Delta = a_{11}a_{22} - a_{12}a_{21} \qquad \text{(Equation 23)}$$

$$\begin{pmatrix} a_1 & a_2 \\ a_3 & a_4 \\ a_5 & a_6 \end{pmatrix} = \frac{1}{\Delta}\begin{pmatrix} (a_{22}-a_{12})M_b g L_g & (a_{11}-a_{21})M_b g L_g \\ -\mu_s a_{22} & \mu_s a_{21} \\ \mu_s a_{22} + \mu_g a_{12} & -(\mu_s a_{21} + \mu_g a_{11}) \end{pmatrix} \qquad \text{(Equation 24)}$$

$$\begin{pmatrix} b_1 \\ b_2 \end{pmatrix} = \frac{1}{\Delta}\begin{pmatrix} -a_{22}\eta\tau_t \\ a_{21}\eta\tau_t \end{pmatrix} \qquad \text{(Equation 25)}$$

the following forms of the state equation are obtained.

$$\frac{d}{dt}\begin{pmatrix} \phi \\ \dot{\phi} \\ \dot{\theta} \end{pmatrix} = \dot{x}$$

$$= \begin{pmatrix} 0 & 1 & 0 \\ a_1 & a_3 & a_5 \\ a_2 & a_4 & a_6 \end{pmatrix}\begin{pmatrix} \phi \\ \dot{\phi} \\ \dot{\theta} \end{pmatrix} + \begin{pmatrix} 0 \\ b_1 \\ b_2 \end{pmatrix}u$$

$$= Ax + Bu \qquad \text{(Equation 26)}$$

$$A = \begin{pmatrix} 0 & 1 & 0 \\ a_1 & a_3 & a_5 \\ a_2 & a_4 & a_6 \end{pmatrix} \quad B = \begin{pmatrix} 0 \\ b_1 \\ b_2 \end{pmatrix} \quad x = \begin{pmatrix} \phi \\ \dot{\phi} \\ \dot{\theta} \end{pmatrix} \qquad \text{(Equation 27)}$$

At this point, $$x = \begin{pmatrix} \phi \\ \dot{\phi} \\ \dot{\theta} \end{pmatrix}$$

is a state vector.

The above modeling is an approximate model when each value of the state vector is zero. Therefore, in order to consider follow-up capability with respect to the position (speed command) in the fore-and-aft direction, a model control system which follows up a stepwise target input is formed to the model. It is assumed that the target input is a constant speed target value. It is assumed that a speed y ($=\dot{\theta}$) is observable, and the speed $y=\dot{\theta}$ is expressed by $y=\dot{\theta}=Cx=(0,0,1)x$.

The control system is formed by an integrator such that a speed y(t) is caused to follow up a stepwise target angular speed $\dot{\theta}_d=v/r$ with no steady-state deviation.

Figure 5:
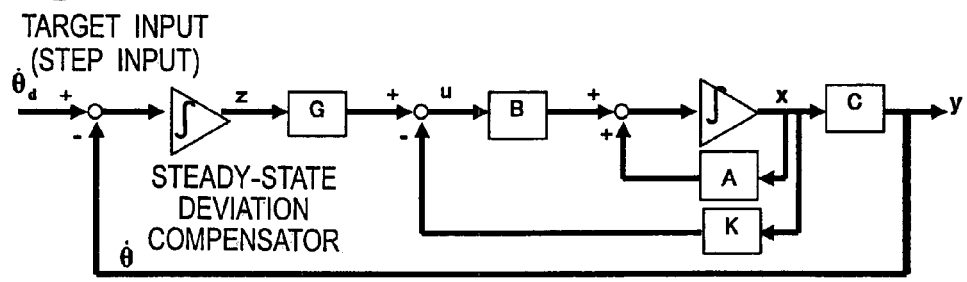
FIG. 5 is a view showing a control block of the two-wheeled inverted robot according to the first embodiment of the present invention.

FIG. 5 shows the control block at that time.

In this case,

K(1×3), G(1×1) are feedback vectors which stabilize the closed loop system.

In this configuration, Equation 28 is obtained from $z=\int (\dot{\theta}_d-\dot{\theta})dt$.

$$\dot{z}=-Cx+\dot{\theta}_d \quad \text{(Equation 28)}$$

The control input is expressed by Equation 29.

$$u=-Kx+Gz \quad \text{(Equation 29)}$$

Assuming that $I_n$ is a 3×3 unit matrix and $I_m=1$, the Equation 30 is obtained.

$$\begin{aligned}\dot{u} &= -K\dot{x} + G\dot{z} \\ &= -K(Ax+Bu) + G(-Cx+\dot{\theta}_d) \\ &= -[K \quad G]\begin{bmatrix} A & B \\ C & 0 \end{bmatrix}\begin{bmatrix} x \\ u \end{bmatrix} + G\dot{\theta}_d\end{aligned} \quad \text{(Equation 30)}$$

The Equation 31 and Equation 32 are obtained from (Equation 26) and (Equation 30).

$$\begin{bmatrix} \dot{x} \\ \dot{u} \end{bmatrix} = \begin{bmatrix} I_n & 0 \\ -K & -G \end{bmatrix}\begin{bmatrix} A & B \\ C & 0 \end{bmatrix}\begin{bmatrix} x \\ u \end{bmatrix} + \begin{bmatrix} 0 \\ G \end{bmatrix}\dot{\theta}_d \quad \text{(Equation 31)}$$

$$y = [C \quad 0][x^T \quad u^T]^T \quad \text{(Equation 32)}$$

At this point, the steady-state values are obtained as follows.

$$\begin{aligned}\begin{bmatrix} x(\infty) \\ u(\infty) \end{bmatrix} &= -\begin{bmatrix} A & B \\ C & 0 \end{bmatrix}^{-1}\begin{bmatrix} I_n & 0 \\ -K & -G \end{bmatrix}^{-1}\begin{bmatrix} 0 \\ G \end{bmatrix}\dot{\theta}_d \\ &= -\begin{bmatrix} A & B \\ C & 0 \end{bmatrix}^{-1}\begin{bmatrix} I_n & 0 \\ -G^{-1}K & -G^{-1} \end{bmatrix}\begin{bmatrix} 0 \\ G \end{bmatrix}\dot{\theta}_d \\ &= \begin{bmatrix} A & B \\ C & 0 \end{bmatrix}^{-1}\begin{bmatrix} 0 \\ I_m \end{bmatrix}\dot{\theta}_d\end{aligned} \quad \text{(Equation 33)}$$

$$y(\infty) = [C \quad 0][x(\infty)^T \quad u(\infty)^T]^T \quad \text{(Equation 34)}$$

Here, $$\begin{aligned}y(\infty) &= [C \quad 0][x(\infty)^T \quad u(\infty)^T]^T \\ &= [C \quad 0]\begin{bmatrix} A & B \\ C & 0 \end{bmatrix}^{-1}\begin{bmatrix} 0 \\ I_m \end{bmatrix}\dot{\theta}_d \\ &= \dot{\theta}_d\end{aligned} \quad \text{(Equation 35)}$$

Therefore, it is found that the steady-state deviation does not exist.

Then, an error system is considered from the steady-state value.

It is assumed that $$x_e=x-x(\infty), u_e=u-u(\infty), e=\dot{\theta}-\dot{\theta}_d,$$

and the formula deformation is performed, then the Equation 36 is obtained.

$$\begin{aligned}\begin{bmatrix} \dot{x}_e \\ \dot{u}_e \end{bmatrix} &= \begin{bmatrix} \dot{x} \\ \dot{u} \end{bmatrix} \\ &= \begin{bmatrix} I_n & 0 \\ -K & -G \end{bmatrix}\begin{bmatrix} A & B \\ C & 0 \end{bmatrix}\begin{bmatrix} x \\ u \end{bmatrix} + \begin{bmatrix} 0 \\ G \end{bmatrix}\dot{\theta}_d \\ &= \begin{bmatrix} I_n & 0 \\ -K & -G \end{bmatrix}\begin{bmatrix} A & B \\ C & 0 \end{bmatrix}\begin{bmatrix} x_e+x(\infty) \\ u_e+u(\infty) \end{bmatrix} + \begin{bmatrix} 0 \\ G \end{bmatrix}\dot{\theta}_d \\ &= \begin{bmatrix} I_n & 0 \\ -K & -G \end{bmatrix}\begin{bmatrix} A & B \\ C & 0 \end{bmatrix}\left\{\begin{bmatrix} x_e \\ u_e \end{bmatrix} + \begin{bmatrix} A & B \\ C & 0 \end{bmatrix}^{-1}\begin{bmatrix} 0 \\ I_m \end{bmatrix}u_r\right\} + \begin{bmatrix} 0 \\ G \end{bmatrix}\dot{\theta}_d \\ &= \begin{bmatrix} I_n & 0 \\ -K & -G \end{bmatrix}\begin{bmatrix} A & B \\ C & 0 \end{bmatrix}\begin{bmatrix} x_e \\ u_e \end{bmatrix} \\ &= \begin{bmatrix} A & B \\ 0 & 0 \end{bmatrix}\begin{bmatrix} x_e \\ u_e \end{bmatrix} + \begin{bmatrix} 0 & 0 \\ -K & -G \end{bmatrix}\begin{bmatrix} A & B \\ C & 0 \end{bmatrix}\begin{bmatrix} x_e \\ u_e \end{bmatrix} \\ &= \begin{bmatrix} A & B \\ 0 & 0 \end{bmatrix}\begin{bmatrix} x_e \\ u_e \end{bmatrix} - \begin{bmatrix} 0 \\ I_m \end{bmatrix}[K \quad G]\begin{bmatrix} A & B \\ C & 0 \end{bmatrix}\begin{bmatrix} x_e \\ u_e \end{bmatrix}\end{aligned} \quad \text{(Equation 36)}$$

The Equation 39 is obtained from the Equations 37 and 38.

$$H = [K \quad G]\begin{bmatrix} A & B \\ C & 0 \end{bmatrix} \quad \text{(Equation 37)}$$

$$w = -H\begin{bmatrix} x_e \\ u_e \end{bmatrix} \quad \text{(Equation 38)}$$

$$\begin{aligned}\begin{bmatrix} \dot{x}_e \\ \dot{u}_e \end{bmatrix} &= \begin{bmatrix} A & B \\ 0 & 0 \end{bmatrix}\begin{bmatrix} x_e \\ u_e \end{bmatrix} - \begin{bmatrix} 0 \\ I_m \end{bmatrix}H\begin{bmatrix} x_e \\ u_e \end{bmatrix} \\ &= \begin{bmatrix} A & B \\ 0 & 0 \end{bmatrix}\begin{bmatrix} x_e \\ u_e \end{bmatrix} + \begin{bmatrix} 0 \\ I_m \end{bmatrix}w\end{aligned} \quad \text{(Equation 39)}$$

When the output is set at e, the Equation 40 is obtained.

$$e=[C0][x_e^T u_e^T]^T \quad \text{(Equation 40)}$$

The error system is regarded as a regulator in which the state feedback of w is performed to (Equation 39) and (Equation 40). Therefore, a feedback gain H of the error system is derived by an optimum regulator method, a pole placement method, and other various design methods. When the gain is used, an optimum servo system can be designed with a small transient response error of the deviation e(t).

The Equation 41 is obtained from (Equation 37).

$$[K \quad G] = H\begin{bmatrix} A & B \\ 0 & 0 \end{bmatrix}^{-1} = [k_1, k_2, k_3, k_4] \quad \text{(Equation 41)}$$

Therefore, assuming that the Equation 42 is the torque command value $\tau_1$ outputted to the motor 3 using the Gain $[k_1, k_2, k_3, k_4]$, $$\tau_1 = \eta\tau_1 u = -\eta\tau_1[k_1, k_2, k_3, k_4]x_1 \quad \text{(Equation 42)}$$

the inverted attitude control and the speed control can simultaneously be realized.

However, $$x_1 = \begin{pmatrix} \phi \\ \dot{\phi} \\ \theta \\ z_1 \end{pmatrix} \quad \text{(Equation 43)}$$

$$z_1 = -\int (\dot{\theta}_d - \dot{\theta})dt = -z \quad \text{(Equation 44)}$$

At this point, $k_1<0$, $k_2<0$, $k_3<0$, $k_4<0$

In the configuration, there are two wheels 2.

Therefore, when a half of the torque command value $\tau_1$ is outputted to each wheel 2 (2a and 2b), the attitude control and speed control can be performed in the translational direction.

Assuming that the torque command values of the wheels 2a and 2b are the left wheel $\tau_{1L}$ and the right wheel $\tau_{1R}$ respectively, the Equations 45 and 46 are obtained.

$$\tau_{1L} = 0.5\tau_1 \quad \text{(Equation 45)}$$

$$\tau_{1R} = 0.5\tau_1 \quad \text{(Equation 46)}$$

Figure 6:
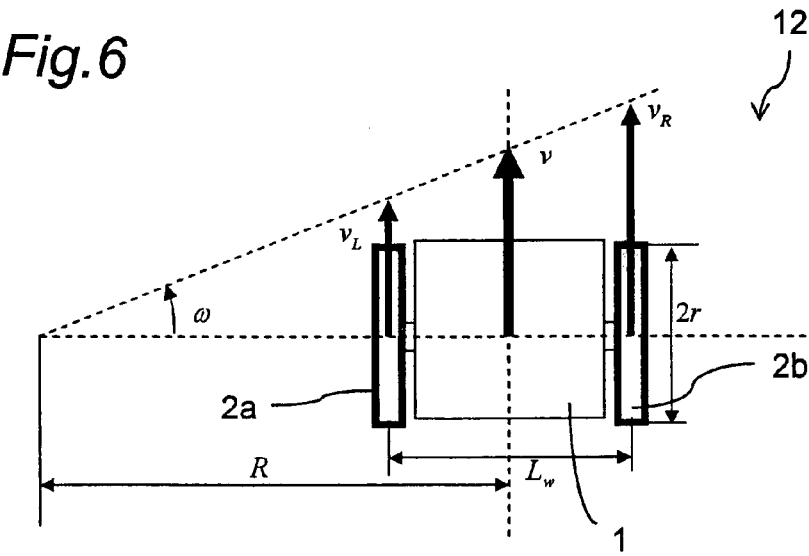
FIG. 6 is a schematic view showing turning control of the two-wheeled inverted robot according to the first embodiment of the present invention.

Then, the turning control 12 will be described with reference to FIG. 6 which is a schematic view showing the turning control.

When the body 1 of the robot is viewed from above, it is assumed that a length between the wheels 2 of the body 1 of the robot is set at $L_w$.

The moving speed of the body 1 of the robot is set at v in the horizontal plane, the rotational speed of the left wheel 2a is set at $v_L$, the rotational speed of the right wheel 2b is set to $v_R$, the turning radius is set at R, and the turning is set at ω.

The rotational angular speed of the left wheel 2a is set at $\dot{\theta}_L$ and the rotational angular speed of the right wheel 2b is set at $\dot{\theta}_R$.

Then, the Equation 47 is obtained.

$$\begin{pmatrix} v \\ \omega \end{pmatrix} = \begin{pmatrix} \frac{r}{2} & \frac{r}{2} \\ \frac{-r}{L_w} & \frac{r}{L_w} \end{pmatrix} \begin{pmatrix} \dot{\theta}_L \\ \dot{\theta}_R \end{pmatrix} \quad \text{(Equation 47)}$$

The turning speed target value is set at $\omega_d$. The feedback (PD control or the like) is performed to the difference between the turning speed target value $\omega_d$ and the actual turning speed ω to determine the torque $\tau_2$ in the turning direction.

It is assumed that the torque $\tau_2$ in the turning direction may be the difference in torque generated in the right and left wheels 2a and 2b.

A half of the torque in the turning direction is added to and subtracted from the right and left wheels 2a and 2b where the target torque in the turning direction can be computed respectively, which allows the control to be realized in the turning direction.

Figure 7:
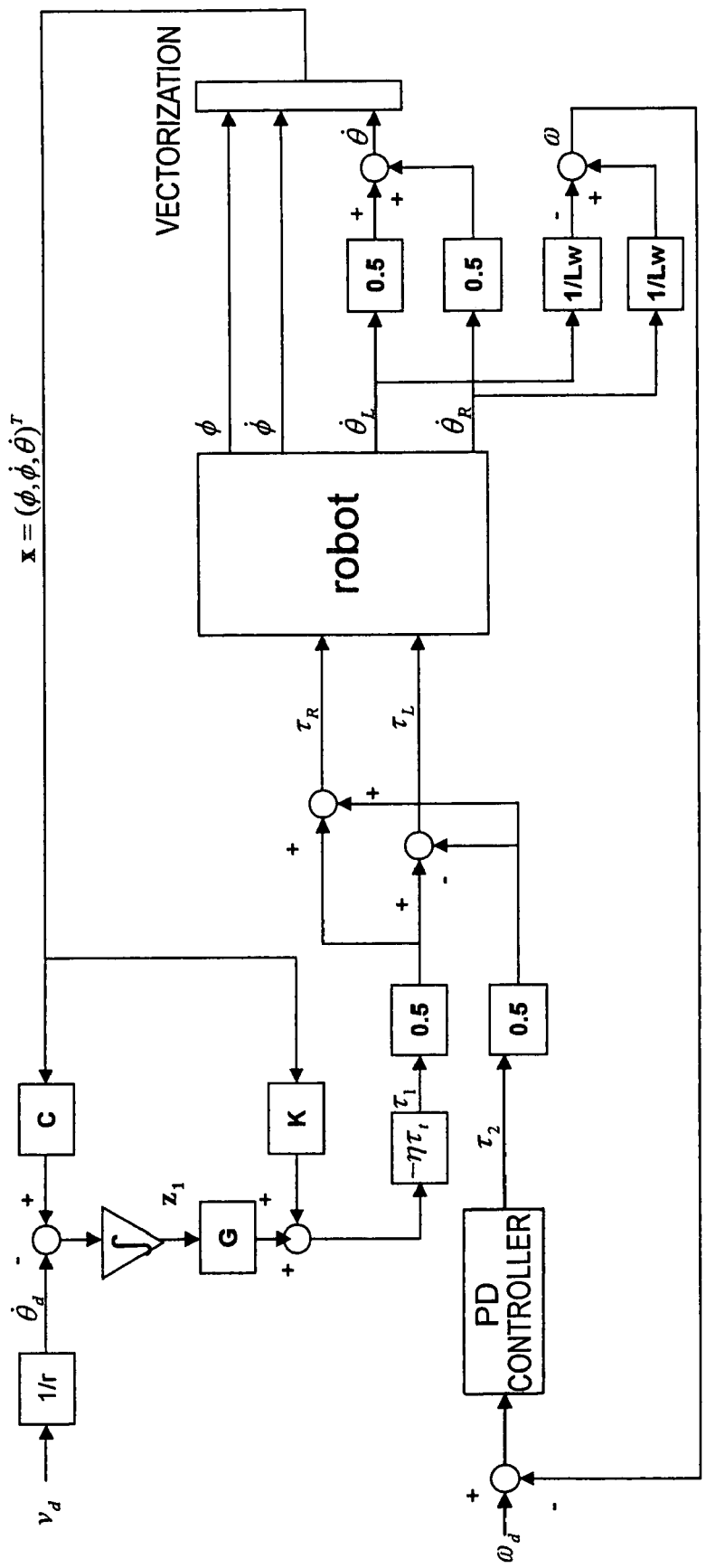
FIG. 7 is a view showing entire running control of in the first embodiment of the present invention.

FIG. 7 shows a control block diagram in which the translational control 11 and the turning control 12 are integrated.

Assuming that the torque command values issued the command to the left wheel 2a and right wheel 2b are $\tau_L$ and $\tau_R$, the Equation 48 is obtained.

$$\begin{pmatrix} \tau_L \\ \tau_R \end{pmatrix} = \begin{pmatrix} \frac{1}{2} & -\frac{1}{2} \\ \frac{1}{2} & \frac{1}{2} \end{pmatrix} \begin{pmatrix} \tau_1 \\ \tau_2 \end{pmatrix} \quad \text{(Equation 48)}$$

Thus, in the robot, the turning and linear running can be performed while the inverted attitude is maintained, by determining the torque.

When the body 1 is separated from the ground 800 as shown in FIG. 1A, the running can be performed while the inverted attitude is maintained based on the control rule described above.

Figure 8:
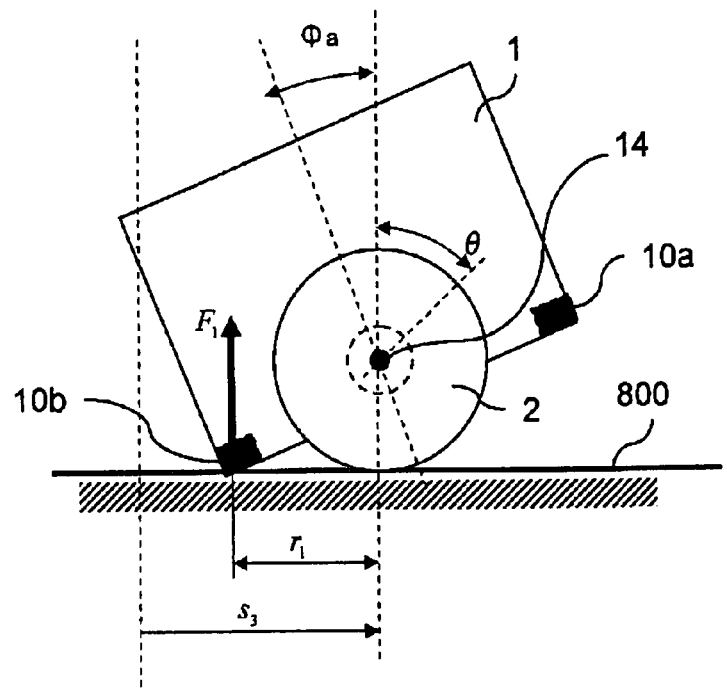
FIG. 8 is a flowchart of a two-wheeled inverted robot according to a second embodiment of the present invention.

Then, in the first embodiment, as shown in FIG. 8, the case where the body 1 is inclined and thereby the lower portion of the body 1 comes into contact with the ground 800 is shown as one example of the case in which a part of the body 1 receives the constraint in the rotational direction. It is assumed that the frictional force is zero between the body 1 and the ground 800, and only vertical drag $F_1$ is generated as the constraint force at a contact point which is horizontally moved from the axle shaft 14 by the distance $r_1$. The contact sensor 10b (because the contact sensor 10a is similar to the contact sensor 10b, the description thereof is represented by the description of the contact sensor 10b) is a sensor which can measure the contact force from another object, the ground 800, or the wall against the body 1. The contact force sensor 10b detects the constraint force $F_1$ in the vertical direction. The distance $r_1$ is already known due to the geometric condition.

At this point, the torque $\tau_a = F_1 r_1$ is generated in the body 1 by the constraint force. When a positional displacement amount is in the state expressed by $s_3>0$, it is considered a case where the contact shown in FIG. 8 is generated (inclination angle is $\phi_a<0$).

In this case, the torque command value of the motor 3 becomes Equation 49 based on Equation 42. In Equation 49, the direction in which the wheel 2 is normally rotated is set at positive (the direction in which the body 1 of the robot is moved in the right direction of FIG. 8 and the body 1 is rotated leftward about the axle shaft 14).

$$\tau_1 = \eta\tau_1[-k_1, -k_2, -k_3, -k_4]x_1 = -\eta\tau_1(k_1\phi + k_2\dot{\phi} + k_3\dot{\theta} + k_4 z_1) \quad \text{(Equation 49)}$$

Because the vertical drag $F_1>0$, the rotation in the inclination direction is constrained, leading to $\phi=\phi_a$ and $\dot{\phi}=0$. In this case, Equation 50 is obtained.

$$\tau_1 = -\eta\tau_1(k_1\phi_a + k_3\dot{\theta} + k_4 z_1) \quad \text{(Equation 50)}$$

Because a torque $\tau_b$ applied to the body 1 becomes a sum of a reaction force $(-\tau_1)$ of a torque from the motor 3 and a torque r caused by the contact, Equation 51 is obtained.

$$\tau_b = \tau_a - \tau_1 = F_1 r_1 + \eta\tau_1(k_1\phi_a + k_3\dot{\theta} + k_4 z_1) \quad \text{(Equation 51)}$$

$\tau_b$ can become either $\tau_b>0$ or $\tau_b<0$ depending on values of $\dot{\theta}$ and $z_1$. In Equation 51, in the case of $\tau_b>0$, because the torque which rotates the body 1 rightward is applied to the body 1, the body 1 is rotated rightward about the axle shaft 14, the contact is eliminated, which allows the body 1 to return to the inverted state. However, in the case of $\tau_b<0$, the leftward rotational torque is applied to the body 1, and the rightward rotational torque is generated as a reaction force in the wheel 2. At this point, because the body 1 is constrained by the external force $F_1$, the torque $\tau_a = F_1 r_1$ generated by the external force $F_1$ is also transmitted as the rotational torque to the wheel 2. Therefore, the excessive torque is applied to the wheel 2 to generate an excessively rotational phenomenon in the wheel 2, which causes the robot to fall in a runaway phenomenon.

Therefore, in the method of controlling the robot according to the first embodiment of the present invention, the contact force sensor 10b detects the contact information, and the detected contact force direction and the torque $\tau_1$ are compared to each other. In the case where the rotational directions are different from each other, the torque command value $\tau_1$ to the motor 3 is set at $\tau_1$ expressed by Equation 52 in which the torque $\tau_a = F_1 r_1$ generated by the contact force is added.

$$\tau_1 = -\eta \tau_1 (k_1 \phi_a + k_3 \dot{\theta} + k_4 z_1) + F_1 r_1 \qquad \text{(Equation 52)}$$

Accordingly, in the method of controlling the robot according to the first embodiment of the present invention, an influence of the contact force from the ground 800 can be removed by computing the torque of the motor 3 based on Equation 52, and the safe two-wheeled inverted robot can be realized while the burden is not placed on the user.

Figure 9:
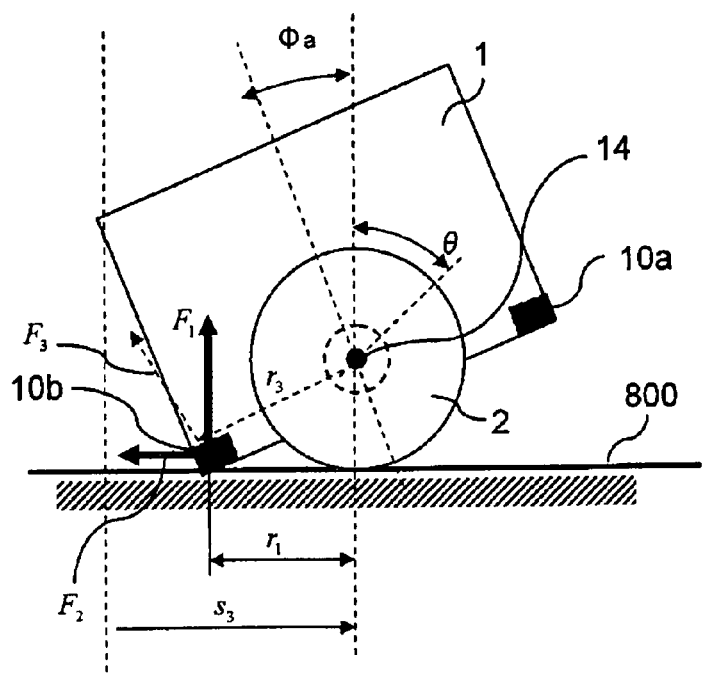
FIG. 9 is a view showing a contact state of the two-wheeled inverted robot according to the first embodiment of the present invention.

In the configuration, when the frictional force $F_2$ is generated between the body 1 and the ground 800, as shown in FIG. 9, the same effect is obtained by the running while the torque in the direction opposite the rotation generated by the resultant force $F_3$ is compensated.

$$\tau_1 = -\eta \tau_1 (k_1 \phi_a + k_3 \dot{\theta} + k_4 z_1) + F_3 r_3 \qquad \text{(Equation 53)}$$

The disturbance force is estimated with no contact sensor by using a disturbance observer, and thereby the control similar to Equation 52 and Equation 53 may be performed with the estimated contact force.

Figure 12:
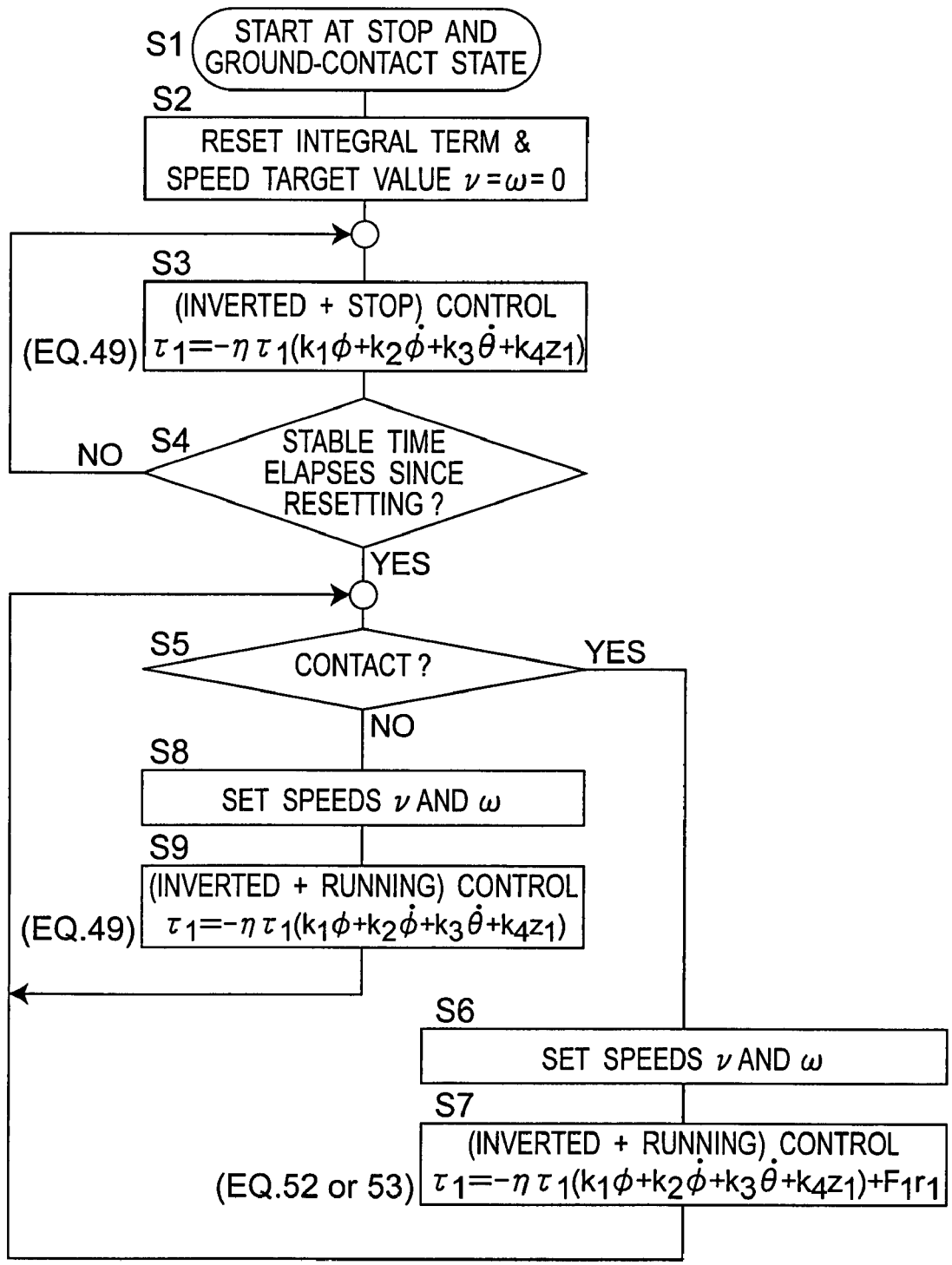
FIG. 12 is a flowchart of the two-wheeled inverted robot according to the first embodiment of the present invention.
Figure 13:
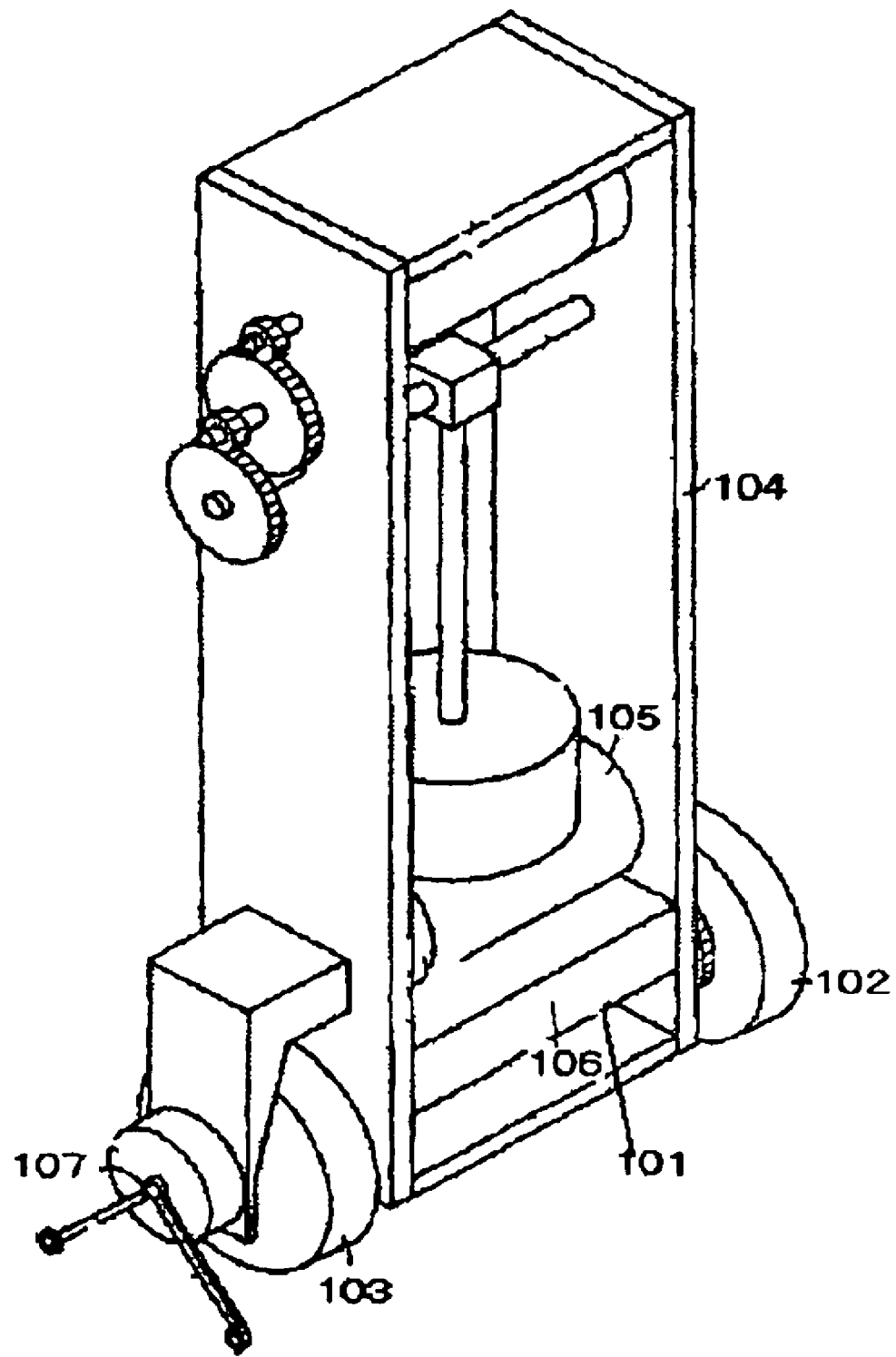
FIG. 13 is a view showing a conventional coaxial two-wheel type moving robot described in Japanese Patent No. 2530652.
Figure 14:
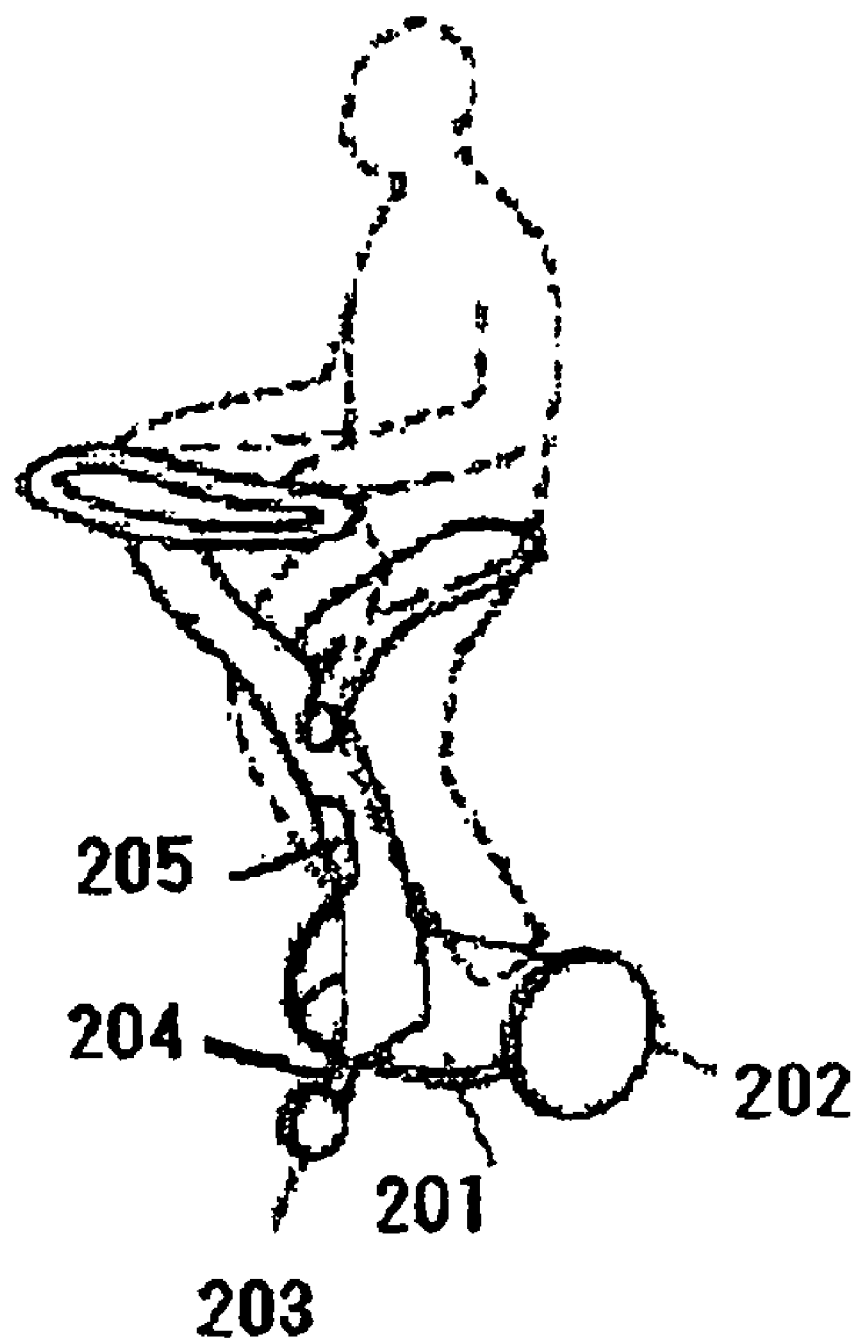
FIG. 14 is a view showing a conventional human-transport coaxial two-wheel type moving robot described in Japanese Unexamined Patent Publication No. 2004-74814.

A running operation flowchart in which change control is used in the first embodiment will be described with reference to FIG. 12.

In an initial state (Step S1), the body 1 of the robot is stopped while inclined. An initial setting is performed as shown in $(z_1, v\omega) = (0,0,0)$ (=Step S2).

Then, the inverted stopping control $(\dot{\theta}_d = v/r = 0)$ expressed by Equation 50 (Step S3) is performed to raise the body 1 of the robot. After a stable time (for example, about five seconds) elapses (Step S4) since the inverted stopping control (Step S3), it is judged whether or not the body 1 is in contact with the ground 800 or the like (Step S5).

When the body 1 is not in contact with the ground 800 or the like in Step S5, the setting of the speed expressed by speed $(v\omega)$ is performed (Step S8). Then, after the inverted running control (Step S9) expressed by (Equation 49) is performed to maintain the running state, the flow returns to Step S5.

When the body 1 is in contact with the ground 800 or the like in Step S5, the setting of the speed expressed by speed $(v\omega)$ is performed (Step S6). Then, after the inverted running control (Step S7) expressed by Equation 52 or Equation 53 is performed to maintain the running state, the flow returns to Step S5.

In Steps S6 and S8, the differential torque is corrected regardless of the contact of the body with the ground, so that the same running can be performed in both the cases.

Thus, according to the first embodiment, the following control can be performed under the control of the control computer unit 9.

The inverted stopping control (Equation (49), Steps S2 and S3) is performed from the initial state in which the body 1 is stopped and in contact with the ground 800, and thereby the body 1 is raised to the inverted position to maintain the inverted state (however the running is not performed). Then, after the predetermined time (stable time) elapses to stabilize the inverted state (Step S4), the contact sensors 10a and 10b start to detect whether or not the body 1 is in contact with the ground or the like (Step S5). When the body 1 is not in contact with the ground or the like in Step S5 (in other words, when the body is not constrained), the inverted stopping control is transferred to the inverted running control (Equation (49), Steps S8 and S9) to maintain the running state, and the contact sensors 10a and 10b detect whether or not the body 1 is in contact with the ground or the like again (Step S5). When the body 1 is in contact with the ground or the like in Step S5 (in other words, when the body is constrained), the inverted stopping control is transferred to the inverted running control (Equation (52) or Equation (53), Steps S6 and S7) to maintain the running state, and the contact sensors 10a and 10b detect whether or not the body 1 is in contact with the ground or the like again (Step S5).

Thus, the inverted two-wheel running is performed while the inverted stopping control (Step S3), the inverted running control (Step S9), and the inverted running control (Step S7) are appropriately switched. Therefore, even if the body 1 is in contact with the ground or the like, the torque ratio contributing to the body rotation can be changed according to the contact state (namely, body constraint state) to prevent the runaway that the running speed is rapidly increased because the excessive torque is applied to the wheel 2 to hardly maintain the attitude control, and the safety running can be continued while the burden is not placed on the user.

Second Embodiment

A second embodiment of the present invention will be described with reference to FIG. 8 which is used in the first embodiment. In the first embodiment, the contact sensors are provided to detect the contact forces. On the other hand, in the second embodiment, the control method will be described in the case where the contact sensor 10b is a sensor which detects only the presence or absence of the contact while not being able to measure the force, or in the case where only the presence or absence of the contact is utilized although the sensor can measure the force.

When a part of the body 1 is in contact with the ground 800 or the like, the body 1 cannot be rotated, and the body 1 is in contact with the ground 800 at least at three points, i.e., at the two wheels 2a and 2b and at least at one other point. In the conventional movement control of the independently two-wheeled drive truck which is in contact with the ground 800 by the auxiliary wheel or the like, the running control is performed to the rotation speed of the wheel 2 by PID control or the like to maintain the running state. Therefore, it can be regarded that the second embodiment has the same configuration as the conventional movement control in the case where the body 1 is in contact with the ground 800. In the case where the body 1 is in contact with the ground 800, the second embodiment has the speed control configuration in which the PI control is substantially performed to the rotation speed as shown by Equation 54.

$$\tau_1 = k_5(\dot{\theta} - \dot{\theta}_d) + k_6 \int (\dot{\theta} - \dot{\theta}_d) dt = k_5(\dot{\theta} - \dot{\theta}_d) + k_6 z_1 \qquad \text{(Equation 54)}$$

Accordingly, when the body 1 is in contact with the ground 800 or the like, the control is performed by changing the control to Equation 54. When the body 1 is not in contact with the ground 800 or the like, the control is performed by changing the control to Equation 50.

Figure 10:
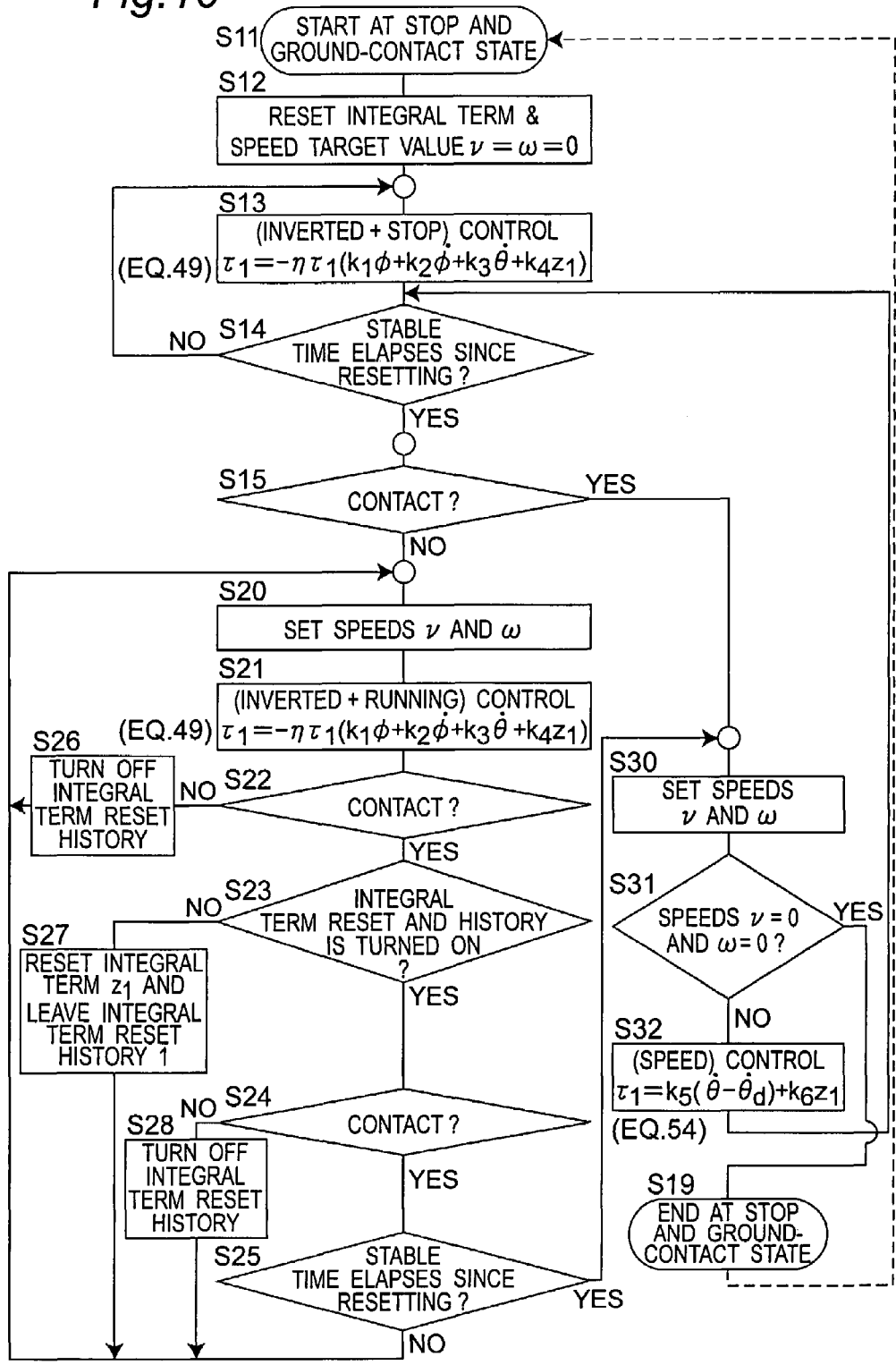
FIG. 10 is a flowchart of the two-wheeled inverted robot according to the second embodiment of the present invention.

A running operation flowchart in which the change control is used in the second embodiment will be described with reference to FIG. 10.

In the initial state (Step S11), the body 1 of the robot is stopped while inclined. The initial setting is performed as shown in $(z_1 v\omega)=(0,0,0)$ (=Step S12). Then, the inverted stopping control $(\dot{\theta}_d=v/r=0)$ expressed by (Equation 50) (Step S13) is performed to raise the body 1 of the robot.

After the stable time (for example, about five seconds) elapses (Step S14) since the inverted stopping control (Step S13), it is judged whether or not the body 1 is in contact with the ground or the like (Step S15). When the body 1 is not in contact with the ground or the like in Step S15, after the setting of the speed (v$\omega$) is performed (Step 20), the inverted running control (Step S21) expressed by Equation 49 is performed to maintain the running state. An integral term reset historical bit bt1 is provided as the condition that the control method is transferred from the inverted running control (Step S21) based on Equation 49 to the speed control (Step S18) based on Equation 54 during the contact. The integral term shall mean integration $z_1$ of a speed difference (positional displacement amount of the positional displacement by the break-down of the balance of the body 1 to the current position of the body 1). During the inverted running control (Step S21), it is judged whether or not the body 1 is in contact with the ground or the like (Step S22).

When the body 1 is not in contact with the ground 800 or the like in Step S22, the integral term reset historical bit bt1 is reset (bt1=0) (Step S26) (namely, while the integral term is not reset), and the flow returns to Step S20.

When the body 1 is in contact with the ground 800 or the like in Step S22, it is judged whether or not the integral term reset history is turned on, namely, it is judged whether or not the integral term reset historical bit bt1 is one (bt1=1) (Step S23). Only in the case of integral term reset historical bit bt1=0 (integral term has been not reset after the contact), the integral term $z_1$ is reset $z_1$=0 (the integral term is reset and historical information on the reset of the integral term is left) (Step S27), and the flow returns to Step S20. The reason why the integral term is reset is that the positional displacement (integration $z_1$ of the speed difference) generated before the contact is set to zero at one to perform the PI control from the contact. Thus, the positional displacement amount prior to the contact can be deleted by resetting the integral term, and the runaway phenomenon of the body 1 can be prevented because the operation control is performed only by the post-contact positional displacement amount of the body 1.

In the case where the integral term reset historical bit bt1 is one (bt1=1) in Step S23, it is judged whether or not the body 1 is in contact with the ground or the like (Step S24).

When the body 1 is not in contact with the ground 800 or the like in Step S24, the integral term reset historical bit bt1 is reset (bt1=0) (Step S28) (namely, while the integral term is not reset), and then, the flow returns to Step S20.

In the case where the body 1 is still in contact with the ground 800 or the like in Step S24 (bt1=1), when the stable time (for example, one second) does not elapse (Step S25), the flow returns to Step S20 to continue the inverted running (Step S21).

On the other hand, when the stable time (for example, one second) elapses, the inverted running (Step S21) is transferred to the speed control (Steps S30 to S32).

When the body 1 is in contact with the ground 800 or the like in Step S15, or when the stable time elapses in Step S25, the speed (v$\omega$) is set (Step S30).

Then, it is judged whether or not the speed (v$\omega$) is (0,0) (Step S31). In the case of (v$\omega$)=(0,0), it is judged that the body 1 is not raised, and then, the flow is ended (Step S19). In the case where the speed (v$\omega$) is not (0,0) in Step S31, namely, (v$\omega$) $\neq$(0,0), the robot runs under the speed control (Step S32) shown by Equation 54, and then, the flow returns to Step S14. Then, it is judged whether or not the stable time (for example, five seconds) of the speed control (Step S32) elapses (Step S14).

Thus, according to the second embodiment, the following control can be performed under the control of the control computer unit 9.

The inverted stopping control (Equation (49), Steps S12 and S13) is performed from the initial state in which the body 1 is stopped and in contact with the ground 800, and thereby the body 1 is raised to the inverted position to maintain the inverted state (however the running is not performed). Then, after the predetermined time (stable time) elapses to stabilize the inverted state (Step S14), the contact sensors 10*a* and 10*b* start to detect whether or not the body 1 is in contact with the ground or the like (Step S15). When the body 1 is not in contact with the ground or the like in Step S15 (in other words, when the body is not constrained), the inverted stopping control is transferred to the inverted running control (Equation (49), Steps S20 and S21) to maintain the running state. When the body 1 is in contact with the ground or the like in Step S15 (in other words, when the body is constrained), the inverted stopping control is transferred to the speed control (Steps S30 to S32). Then, after the predetermined time (stable time) elapses to stably perform the speed control (Step S14), the contact sensors 10*a* and 10*b* detect whether or not the body 1 is in contact with the ground or the like again (Step S15). When the body 1 is not in contact with the ground or the like in Step S15 (when the body 1 is successful in standing up), the speed control is transferred to the inverted running control (Equation (49), Steps S20 and S21) to maintain the running state. When the body 1 is in contact with the ground or the like in Step S15 (when the body 1 fails to stand up), the speed control (Steps S30 to S32) is continued. In performing the speed control (Steps S30 to S32), when the speed and the angular speed are zero, it is judged that the body 1 is in contact with the ground 800 or the like, namely the body is not raised, and the raising drive of the body 1 is stopped to maintain the contact state.

In performing the inverted running control (Equation (49), Steps S20 and S21), When the body 1 is in contact with the ground or the like (Step S22), the positional displacement amount until the contact is reset to be zero, and then, the operation control is performed only by the positional displacement amount from the contact. Therefore, the runaway phenomenon of the body 1 can be prevented. In the inverted running control, when the contact is continued after the stable time elapses since the positional displacement amount until the contact is reset to be zero, it is judged that the inverted state of the body 1 is broken down, and then, the operation control can be performed such that the body 1 is returned to the inverted state by changing the inverted running control to the speed control.

Thus, the inverted two-wheel running is performed while the inverted stopping control (Step S13), the inverted running control (Step S21), and the running control (Step S32) are appropriately switched. Therefore, even if the body 1 is in contact with the ground or the like, the torque ratio contributing to the body rotation can be changed according to the contact state (namely, body constraint state) to prevent the runaway that the running speed is rapidly increased because the excessive torque is applied to the wheel 2 to hardly maintain the attitude control, and the safety running can be continued while the burden is not placed on the user.

Third Embodiment

Figure 11:
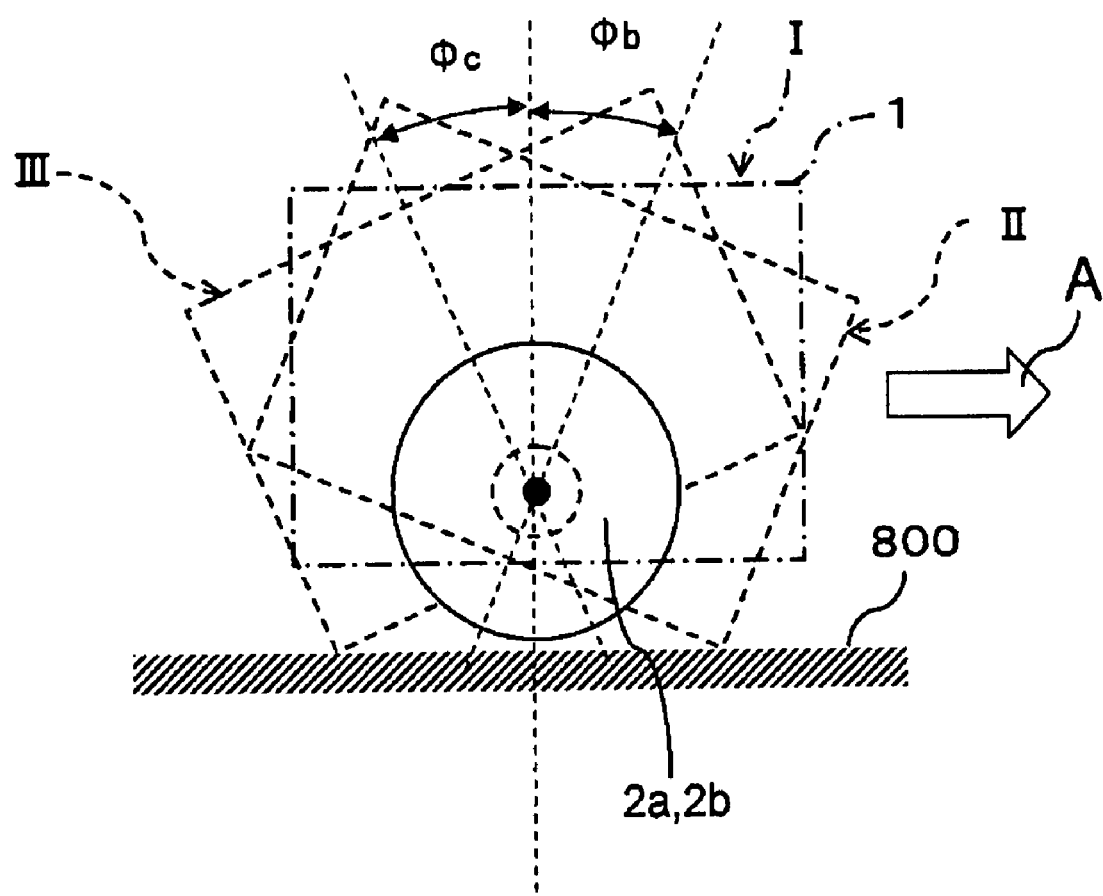
FIG. 11 is an explanatory view showing a state in which a body of a two-wheeled inverted robot according to a third embodiment of the present invention is inclined and certainly comes into contact with the ground.

In the second embodiment, the presence or absence of the contact is detected by the actual inputs of the contact sensors 10a and 10b to change the control method. On the other hand, in a third embodiment of the present invention, it is found that the ground 800 on which the body runs is a flat surface, the control method is changed by the inclination angle of the body 1 with no contact sensor, and the change control is performed when the inclination angle of the body 1 exceeds a predetermined angle. That is, as shown in FIG. 11, when the body 1 is inclined and always in contact with the ground 800, the inclination angle of the body 1 is set as follows: $\phi > \phi_b > 0$ $\phi < \phi_c < 0$. When the body 1 is inclined but not in contact with the ground 800, namely, in the case of ($\phi_b \geq \phi \geq \phi_c$), the inverted running control shown by Equation 49 is performed to maintain the running state. When the body 1 is inclined and comes into contact with the ground 800, namely, in the case of ($\phi > \phi_b$ or $\phi < \phi_c$), the control is performed based on Equation 54.

Here, as one example, it is assumed that when, as shown in FIG. 11, the body 1 is inclined to the inclination position (II or III shown by dot line) by 10° with respect to the inverted stopping or the running state (I shown by an alternate long and short dash line), the body 1 is in contact with the ground 800. In consideration of a tolerance of 0.5°, when the body is inclined not lower than 9.5°, it may be judged that the body 1 is in contact with the ground 800. That is, in the case of $\phi > \phi_b = 9.5° > 0$ or $\phi < \phi_c = -9.5° < 0$, it may be judged that the body 1 is in contact with the ground 800. Therefore, when the body 1 is inclined but not in contact with the ground 800, namely, in the case of ($\phi_b = 9.50° \geq \phi \geq \phi_c = -9.5°$), the inverted running control shown by Equation 49 is performed to maintain the running state. When the body 1 is inclined and comes into contact with the ground 800, namely, in the case of ($\phi > \phi_b = 9.5°$ or $\phi < \phi_c = -9.5°$), the speed control is performed based on Equation 54.

Thus, the robot runs while the control method is changed according to the inclination angle of the body 1. Therefore, even if the body 1 comes into contact with the flat surface, the runaway is not generated and the robot can continue the safe running safely while the burden is not placed on the user.

By properly combining the arbitrary embodiments of the aforementioned various embodiments, the effects possessed by the embodiments can be produced.

As described above, the present invention can provide a two-wheeled inverted robot and the control method thereof, in which the attitude control and the running state can be maintained and the safe movement can be performed while the burden is not placed on the user, even when the body comes into contact with the ground or the wall to constrain the rotation.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A two-wheeled inverted robot comprising:
a body;
two wheels coaxially arranged on the body;
a drive device for driving the wheels respectively;
a first state detection means for detecting at least one of an inclination angle and an inclination angular speed of the body;
a second state detection means for detecting at least one of a rotation angle and a rotational angular speed of the wheel;
a body constraint recognizing means for receiving information detected by the first state detection means or the second state detection means and detecting whether or not rotation of the body in an inclination direction is constrained; and
a control means for determining a command value to the drive device, changing a plurality of running control methods by the determined command value to drive the drive device, and thereby performing running control of the body,
wherein the body includes at least one contact sensor for detecting a contact force to the body, and the body constraint recognizing means receives contact information detected by the contact sensor and information detected by the first or second state detection means to recognize a body constraint state, and the control means determines, based on detection result of the body constraint recognizing means, the command value to the drive device for changing the plurality of running control methods, the drive device is driven by the determined command value, and the running control of the body is performed to maintain a running state,
wherein an integration value of an error of the rotational angular speed of the wheel is reset when the body is constrained.

2. A two-wheeled inverted robot comprising:
a body;
two wheels coaxially arranged on the body;
a drive device for driving the wheels respectively;
a first state detection means for detecting at least one of an inclination angle and an inclination angular speed of the body;
a second state detection means for detecting at least one of a rotation angle and a rotational angular speed of the wheel;
a body constraint recognizing means for recognizing a body constraint state where rotation of the body in an inclination direction is constrained, when the rotation angle of the body detected by the first state detection means exceeds a predetermined value; and
a control means for determining a command value to the drive device, changing, out of the body constraint state after the body is stopped, by the determined command value, a running control method for performing an inverted stopping control wherein the drive device is driven to raise the body to an inverted position to maintain in an inverted state while the body is stopped, a running control method for performing a first inverted running control wherein the body is driven for running while maintaining the inverted state of the body without considering the body constraint state, and a running control method for performing a second inverted running control wherein the body is driven for running while maintaining the inverted state of the body with considering the body constraint state to drive the drive device, and thereby performing running control of the body, wherein the control means determines, based on detection result of the body constraint recognizing means, the command value to the drive device for changing the plurality of running control methods, the drive device is driven by the determined command value, the running control of the body is performed to maintain a running state, and during the body constraint, the control method is changed to a control method in which a torque generated by a constraint force to the body is added to torques for rotating and driving the wheels, wherein an integration value of an error of the rotational angular speed of the wheel is reset when the body is constrained.

3. A two-wheeled inverted robot comprising:

a body;

two wheels coaxially arranged on the body;

a drive device for driving the wheels respectively;

a first state detection means for detecting at least one of an inclination angle and an inclination angular speed of the body;

a second state detection means for detecting at least one of a rotation angle and a rotational angular speed of the wheel;

a body constraint recognizing means for receiving information detected by the first state detection means or the second state detection means and detecting whether or not rotation of the body in an inclination direction is constrained; and a control means for determining a command value to the drive device, changing a plurality of running control methods by the determined command value to drive the drive device, and thereby performing running control of the body, wherein the body includes at least one contact sensor for detecting a contact force to the body, and the body constraint recognizing means receives contact information detected by the contact sensor and information detected by the first or second state detection means to recognize a body constraint state, and the control means determines, based on detection result of the body constraint recognizing means, the command value to the drive device for changing the plurality of running control methods, the drive device is driven by the determined command value, and the running control of the body is performed to maintain a running state, and wherein, during the body constraint, feedback to the inclination angle and the inclination angular speed of the body is stopped, and an integration value of an error of the rotational angular speed of the wheel is reset when the body is constrained.

4. A two-wheeled inverted robot comprising:

a body;

two wheels coaxially arranged on the body;

a drive device for driving the wheels respectively;

a first state detection means for detecting at least one of an inclination angle and an inclination angular speed of the body;

a second state detection means for detecting at least one of a rotation angle and a rotational angular speed of the wheel;

at least one contact sensor for detecting presence or absence of contact whether or not the body comes into contact with the ground, the body being provided with the contact sensor;

a body constraint recognizing means for receiving, as contact information, a fact that the body comes into contact with the ground, the fact being detected by the contact sensor, and then recognizing, based on the received contact information, a body constraint state where rotation of the body in an inclination direction is constrained; and a control means for determining a command value to the drive device, and changing, out of a state in which the body is stopped and is in contact with the ground, by the determined command value, a running control method for performing an inverted stopping control wherein the drive device is driven to raise the body to an inverted position to maintain an inverted state while the body is stopped, a running control method for performing a first inverted running control wherein the body is driven for running while maintaining the inverted state of the body without considering any contact to the body, and a running control method for performing a second inverted running control wherein the body is driven for running while maintaining the inverted state of the body with considering any contact to the body to drive the drive device, and thereby performing running control of the body, wherein the control means determines, based on detection result of the body constraint recognizing means, the command value to the drive device for changing the plurality of running control methods, the drive device is driven by the determined command value, and the running control of the body is performed to maintain a running state.

5. A two-wheeled inverted robot according to claim 4, wherein when the body constraint recognizing means recognizes the body constraint state and then the control means performs the second inverted running control, with considering the body constraint state, the body is driven for running under a speed control by a PID control with respect to a rotary speed of the body while maintaining the inverted state of the body, and in the speed control by the PID control to the rotary speed of the body, an integration value of an error of the rotational angular speed of the wheel is reset, so that an integration value of a speed difference that is a positional displacement of the body generated before the contact of the body to the ground is set to zero to perform the PI control from the contact.

6. A two-wheeled inverted robot comprising:

a body;

two wheels coaxially arranged on the body;

a drive device for driving the wheels respectively;

a first state detection means for detecting at least one of an inclination angle and an inclination angular speed of the body;

a second state detection means for detecting at least one of a rotation angle and a rotational angular speed of the wheel;

a body constraint recognizing means for recognizing a body constraint state where rotation of the body in an inclination direction is constrained, when the rotation angle of the body detected by the first state detection means exceeds a predetermined value; and a control means for determining a command value to the drive device, and changing, out of the body constraint state after the body is stopped, by the determined command value, a running control method for performing an inverted stopping control wherein the drive device is driven to raise the body to an inverted position to maintain an inverted state while the body is stopped, a running control method for performing a first inverted running control wherein the body is driven for running while maintaining the inverted state of the body without considering the body constraint state, and a running control method for performing a second inverted running control wherein the body is driven for running while maintaining the inverted state of the body with considering the body constraint state to drive the drive device, and thereby performing running control of the body, wherein the control means determines, based on detection result of the body constraint recognizing means, the command value to the drive device for changing the plurality of running control methods, the drive device is driven by the determined command value, the running control of the body is performed to maintain a running state, and during the body constraint, the control method is changed to a control method in which a torque generated by a constraint force to the body is added to torques for rotating and driving the wheels.

7. A two-wheeled inverted robot comprising:

a body;

two wheels coaxially arranged on the body;

a drive device for driving the wheels respectively;

a first state detection means for detecting at least one of an inclination angle and an inclination angular speed of the body;

a second state detection means for detecting at least one of a rotation angle and a rotational angular speed of the wheel;

at least one contact sensor for detecting a contact force received from the ground by the body that is generated by a fact that the body comes into contact with the ground, the body being provided with the contact sensor;

a body constraint recognizing means for receiving, as contact information, the contact force to the body that is detected by the contact sensor, and recognizing, based on the received contact information, a body constraint state where rotation of the body in an inclination direction thereof is constrained; and a control means for determining a command value to the drive device, and changing, out of a state in which the body is stopped and is in contact with the ground, by the determined command value, a running control method for performing an inverted stopping control wherein the drive device is driven to raise the body to an inverted position to maintain an inverted state while the body is stopped, a running control method for performing a first inverted running control wherein the body is driven so as to run while maintaining the inverted state of the body without considering any contact to the body, and a running control method for performing a second inverted running control wherein the body is driven so as to run while maintaining the inverted state of the body with considering any contact to the body to drive the drive device, and thereby perform running control of the body, wherein the control means is operable to:

drive the drive device in the state in which the body is stopped and is in contact with the ground to raise the body to the inverted position and then perform the inverted stopping control operation;

make the body constraint recognizing means start to detect the presence or absence of contact information from the contact sensor after the inverted state becomes stable;

change the inverted stopping control to the first inverted running control to maintain a running state when there is no contact information from the contact sensor and the body constraint recognizing means does not recognize the body constraint state; and change from the inverted stopping control or the first inverted running control to the second inverted running control to compare a direction of the contact force with a torque command value for the drive device when there is contact information from the contact sensor and the body constraint recognizing means recognizes the body constraint state; and then, when rotational directions are different from each other and when a value in which a torque generated by the contact force is added to the torque command value to the drive device is set as a new torque command value, the control means drives the drive device based on the new torque command value.

* * * * *

UNITED STATES PATENT AND TRADEMARK OFFICE
CERTIFICATE OF CORRECTION

PATENT NO. : 7,635,041 B2  Page 1 of 1
APPLICATION NO. : 11/790749
DATED : December 22, 2009
INVENTOR(S) : Yuji Adachi It is certified that error appears in the above-identified patent and that said Letters Patent is hereby corrected as shown below:

On the title page
In the title of the invention, in item (54) & column 1, line 1:

change "INVERTED TWO-WHEELED ROBOT" to --TWO-WHEELED INVERTED ROBOT--

Signed and Sealed this

Twenty-ninth Day of June, 2010

David J. Kappos
*Director of the United States Patent and Trademark Office*